United States Patent
Christensen et al.

(10) Patent No.: US 8,000,230 B2
(45) Date of Patent: Aug. 16, 2011

(54) FULLY REDUNDANT LINEARLY EXPANDABLE BROADCAST ROUTER

(75) Inventors: Carl Christensen, South Jordan, UT (US); David Lynn Bytheway, Murray, UT (US); Mitchell T. Hayden, Syracuse, UT (US)

(73) Assignee: GVBB Holdings S.A.R.L., Luxembourg (LU)

( * ) Notice: Subject to any disclaimer, the term of this patent is extended or adjusted under 35 U.S.C. 154(b) by 1068 days.

(21) Appl. No.: 10/518,212

(22) PCT Filed: Jun. 13, 2003

(86) PCT No.: PCT/US03/18821
§ 371 (c)(1),
(2), (4) Date: Dec. 16, 2004

(87) PCT Pub. No.: WO04/002080
PCT Pub. Date: Dec. 31, 2003

(65) Prior Publication Data
US 2006/0120342 A1    Jun. 8, 2006

Related U.S. Application Data

(60) Provisional application No. 60/390,845, filed on Jun. 21, 2002.

(51) Int. Cl.
*G01R 31/08* (2006.01)
(52) U.S. Cl. .................. 370/219; 370/220; 370/222
(58) Field of Classification Search .............. 370/219, 370/220, 222
See application file for complete search history.

(56) References Cited

U.S. PATENT DOCUMENTS

| | | | |
|---|---|---|---|
| 5,544,163 | A | 8/1996 | Madonna |
| 5,598,408 | A | 1/1997 | Nickolls et al. |
| 5,737,320 | A | 4/1998 | Madonna |
| 6,223,242 | B1 | 4/2001 | Sheafor et al. |
| 6,487,169 | B1 | 11/2002 | Tada |
| 6,577,634 | B1 | 6/2003 | Tsukakoshi et al. |
| 6,594,229 | B1 | 7/2003 | Gregorat |
| 6,680,939 | B1 * | 1/2004 | Lydon et al. ........... 370/366 |
| 6,693,901 | B1 | 2/2004 | Byers et al. |
| 6,885,635 | B1 * | 4/2005 | Haq et al. ............. 370/219 |
| 2002/0039364 | A1 | 4/2002 | Kamiya et al. |
| 2002/0085578 | A1 | 7/2002 | Dell et al. |

(Continued)

FOREIGN PATENT DOCUMENTS
EP    1199885    4/2002
(Continued)

OTHER PUBLICATIONS
Search Report Dated Sep. 1, 2003.

*Primary Examiner* — Jason E Mattis
(74) *Attorney, Agent, or Firm* — Arent Fox LLP

(57) ABSTRACT

A fully redundant linearly expandable router is comprised of first, second, third and fourth router components. Each router component includes first and second routing engines. First, second and third discrete links couple the first routing engine to the first routing engines, respectively. Fourth and fifth discrete links couple the first routing engine to the first routing engines, respectively. A sixth discrete link couples the routing engine to the routing engine. Seventh, eighth and ninth discrete links couple the second routing engine to the second routing engines, respectively. Tenth and eleventh discrete links couple the second routing engine to the second routing engines, respectively. A twelfth discrete link couples the routing engine to the router engine.

6 Claims, 10 Drawing Sheets

U.S. PATENT DOCUMENTS

| | | | |
|---|---|---|---|
| 2002/0159678 A1* | 10/2002 | Derventzis et al. | 385/16 |
| 2003/0067925 A1 | 4/2003 | Choe et al. | |
| 2003/0099247 A1 | 5/2003 | Toutant et al. | |
| 2003/0202520 A1* | 10/2003 | Witkowski et al. | 370/400 |
| 2006/0190774 A1* | 8/2006 | Mitchell | 714/43 |

FOREIGN PATENT DOCUMENTS

| | | |
|---|---|---|
| JP | 8251173 | 9/1996 |
| JP | 09-505190 | 5/1997 |
| JP | 11-341070 | 12/1999 |
| JP | 2000174769 | 6/2000 |
| JP | 2001-356847 | 12/2001 |
| KR | 20010059202 | 7/2001 |
| KR | 20010070072 | 7/2001 |
| WO | WO 95/24788 | 9/1995 |
| WO | WO 00/51290 A2 | 8/2000 |
| WO | WO 01/86454 A2 | 11/2001 |

* cited by examiner

FULLY REDUNDANT LINEARLY EXPANDABLE BROADCAST ROUTER

CROSS REFERENCE

This application claims the benefit, under 35 U.S.C. §365 of International Application PCT/US03/18821, filed Jun. 13, 2003, which was published in accordance with PCT Article 21(2) on Dec. 31, 2003 in English and which claims the benefit of United States provisional patent application No. 60/390,845, filed Jun. 21, 2002.

FIELD OF THE INVENTION

The present invention relates to broadcast routers and, more particularly, to a fully redundant linearly expandable broadcast router having plural routing engines arranged in a fully connected topology.

BACKGROUND OF THE INVENTION

A broadcast router allows each one of a plurality of outputs therefrom to be assigned the signal from any one of a plurality of inputs thereto. For example, an N×M broadcast router has N inputs and M outputs coupled together by a routing engine which allows any one of the N inputs to be applied to each one of the M outputs. Oftentimes, it is desirable to construct larger broadcast routers, for example a 4N×4M broadcast router. One solution to building larger broadcast routers was to use the smaller broadcast router as a building block of the proposed larger broadcast router. This technique, however, resulted in the exponential growth of the proposed larger broadcast routers. For example; to construct a 4N×4M broadcast router required 16 N×M broadcast routers. As a result, large broadcast routers constructed in this manner were often both expensive and unwieldy. Linearly expandable broadcast routers overcame the problems of geometric expansion. However, conventionally configured linearly expandable broadcast routers suffer from other types of deficiencies. For example, oftentimes, they are susceptible to catastrophic failures which cause plural broadcast router components to fail in response to a single break.

SUMMARY OF THE INVENTION

A fully redundant linearly expandable router is configured to include three or more router components, each of which includes first and second routing engines. The first routing engines of the three or more router components are arranged in a first fully connected topology whereby an input side of each one of the three or more first routing engines includes a discrete link to an input side of each one of the remaining ones of the three or more first routing engines. Similarly, the second routing engines of the three or more router components are arranged in a second fully connected topology whereby an input side of each one of the three or more second routing engines includes a discrete link to an input side of each one of the remaining ones of the three or more second routing engines. By interconnecting the input sides of the three or more routing engines in this manner, all of the first routing engines will have the same XN inputs, where X is the number of router components forming part of the linearly expandable router and N is the number of inputs to each individual routing engine, and a backup routing engine in the event of a failure thereof.

DETAILED DESCRIPTION

Figure 1:
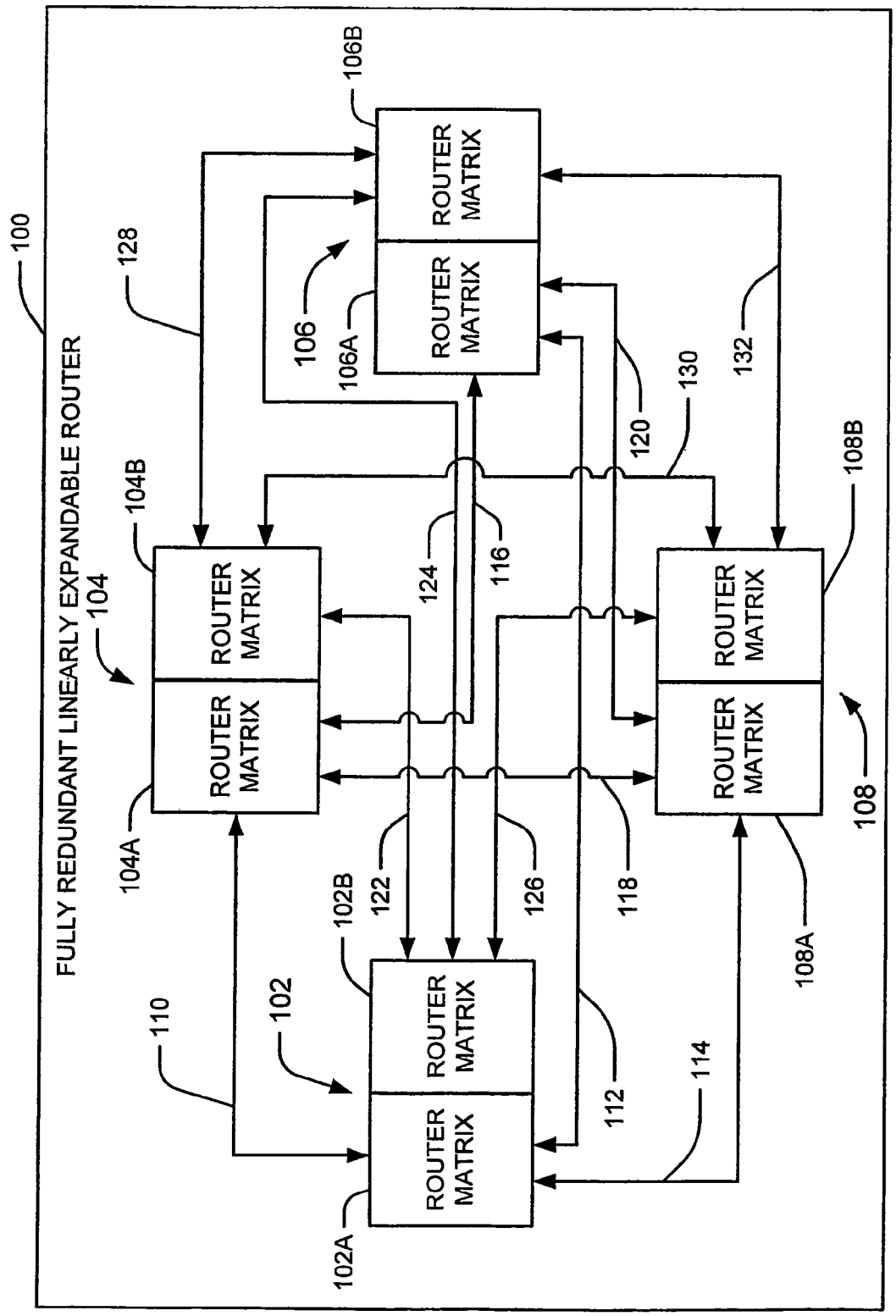
FIG. 1 is a block diagram of a fully redundant linearly expandable broadcast router constructed in accordance with the teachings of the present invention.

Referring first to FIG. 1, a fully redundant linearly expandable broadcast router 100 constructed in accordance with the teachings of the present invention will now be described in greater detail. As may now be seen, the fully redundant linearly expandable broadcast router 100 is comprised of plural broadcast router components coupled to one another to form the larger fully redundant linearly expandable broadcast router 100. Each broadcast router component is a discrete router device which includes first and second router matrices, the second router matrix being redundant of the first router matrix. Thus, each broadcast router has first and second routing engines, one for each of the first and second router matrices, each receiving, at an input side thereof, the same input digital audio streams and placing, at an output side thereof, the same output digital audio streams. As disclosed herein, each of the broadcast router components used to construct the fully redundant linearly expandable broadcast router are N×M sized broadcast routers. However, it is fully contemplated that the fully redundant linearly expandable broadcast router 100 could instead be constructed of broadcast router components of different sizes relative to one another.

As further disclosed herein, the fully redundant linearly expandable broadcast router 100 is formed by coupling together first, second, third and fourth broadcast router components 102, 104, 106 and 108. Of course, the present disclosure of the fully redundant linearly expandable broadcast router 100 as being formed of four broadcast router components is purely by way of example. Accordingly, it should be clearly understood that a fully redundant linearly expandable broadcast router constructed in accordance with the teachings of the present invention may be formed using various other numbers of broadcast router components as long as the total number of broadcast router components which collectively form the linearly expandable broadcast router is equal to or greater than three. The first, second, third and fourth broadcast router components 102, 104, 106 and 108 which, when fully connected in the manner disclosed herein, collectively form the fully redundant linearly expandable broadcast router 100, may either be housed together in a common chassis as illustrated in FIG. 1 or, if desired, housed in separate chassis. While, as previously set forth, the broadcast router components 102, 104, 106 and 108 may have different sizes relative to one another or, in the alternative, may all have the same N×M size, one size that has proven suitable for the uses contemplated herein is 256×256. Furthermore, a suitable configuration for the fully redundant linear expandable broadcast router 100 would be to couple five broadcast router components, each sized at 256×256, thereby resulting in a 1,280×1,280 broadcast router.

The first broadcast router component 102 is comprised of a first router matrix 102a and a second (or redundant) router matrix 102b used to replace the first router matrix 102a in the event of a failure thereof. Similarly, each one of the second, third and fourth broadcast router components 104, 106, and 108 of the fully redundant linearly expandable broadcast router 100 are comprised of a first router matrix 104a, 106a and 108a, respectively, and a second (or redundant) router matrix 104b, 106b and 108b, respectively, used to replace the first router matrix 104a, 106a and 108a, respectively, in the event of a failure thereof. Of course, the designation of the second router matrices 102b, 104b, 106b and 108b as backups for the first router matrices 102a, 104a, 106a and 108a, respectively, is purely arbitrary and it is fully contemplated that any either of a router matrix pair residing within a broadcast router component may act as a backup for the other of the router matrix pair residing within that broadcast router component.

As may be further seen in FIG. 1, the first router matrix 102a of the first broadcast router component 102, the first router matrix 104a of the second broadcast router component 104, the first router matrix 106a of the third broadcast router component 106 and the first router matrix 108a of the fourth broadcast router component 108 are coupled together in a first arrangement of router matrices which conforms to a fully connected topology. Similarly, the second router matrix 102b of the first broadcast router component 102, the second router matrix 104b of the second broadcast router component 104, the second router matrix 106b of the third broadcast router component 106 and the second router matrix 108b of the fourth broadcast router component 108 are coupled together in a second arrangement which, like the first arrangement, conforms to a fully connected topology. In a fully connected topology, each router matrix of an arrangement of router matrices is coupled, by a discrete link, to each and every other router matrix forming part of the arrangement of router matrices.

Thus, for the first arrangement of router matrices, first, second and third bi-directional links 110, 112 and 114 couples the first router matrix 102a of the first broadcast router component 102 to the first router matrix 104a of the second broadcast router component 104, the first router matrix 106a of the third broadcast router component 106 and the first router matrix 108a of the fourth broadcast router component 108, respectively. Additionally, fourth and fifth bi-directional links 116 and 118 couple the first router matrix 104a of the second broadcast router component 104 to the first router matrix 106a of the third broadcast router component 106 and the first router matrix 108a of the fourth broadcast router component 108, respectively. Finally, a sixth bi-directional link 120 couples the first router matrix 106a of the third broadcast router component 106 to the first router matrix 108a of the fourth broadcast router component 108. Variously, the bi-directional links 110 through 120 may be formed of copper wire, optical fiber or another transmission medium deemed suitable for the exchange of digital signals.

Similarly, for the second arrangement of router matrices, first, second and third bi-directional links 122, 124 and 126 couples the second router matrix 102b of the first broadcast router component 102 to the second router matrix 104b of the second broadcast router component 104, the second router matrix 106b of the third broadcast router component 106 and the second router matrix 108b of the fourth broadcast router component 108, respectively. Additionally, fourth and fifth bi-directional links 128 and 130 couple the second router matrix 104b of the second broadcast router component 104 to the second router matrix 106b of the third broadcast router component 106 and the second router matrix 108b of the fourth broadcast router component 108, respectively. Finally, a sixth bi-directional link 132 couples the second router matrix 106b of the third broadcast router component 106 to the second router matrix 108b of the fourth broadcast router component 108. Again, the bi-directional links 122 through 132 may be formed of copper wire, optical fiber or another transmission medium deemed suitable for the exchange of digital signals.

Of course, rather than the single bi-directional links between pairs of router matrices illustrated in FIG. 1, in an alternate embodiment of the invention, it is contemplated that the pairs of router matrices may instead be coupled together by first and second uni-directional links. Such an alternate configuration is illustrated in each one of FIGS. 2-5.

Figure 2:
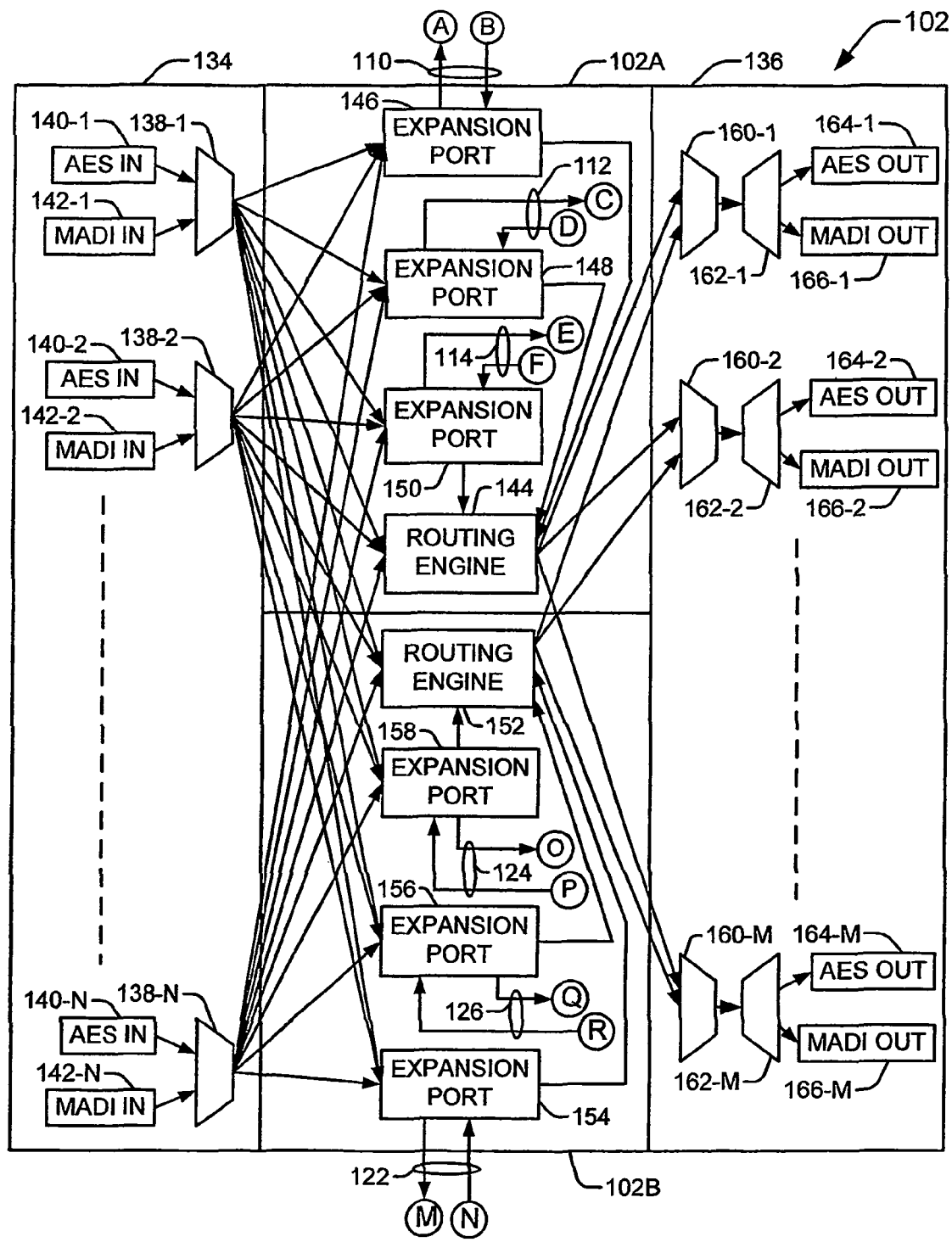
FIG. 2 is an expanded block diagram of a first broadcast router component of the fully redundant linearly expandable broadcast router of FIG. 1.

Turning now to FIGS. 2-5, the fully redundant linearly expandable broadcast router 100 will now be described in greater detail. The first broadcast router component 102 of the fully redundant linearly expandable broadcast router 100 is illustrated in FIG. 2. As may now be seen, the first broadcast router component is comprised of an input side 134, an output side 136 and the first and second router matrices 102a and 102b, both of which are coupled between the input and output sides 134 and 136. The input side 134 includes N selectors 138-1 through 138-N arranged such that the output of each one of the selectors provides one of n inputs to the first and second router matrices 102a and 102b. As disclosed herein, each one of the selectors 138-1 through 138-N is a 2:1 selector circuit having, as a first input 140-1 through 140-N, respectively, an input digital audio data stream conforming to the Audio Engineering Society-11 ("AES-11") standard and, as a second input 142-1 through 142-N, respectively, an input digital audio data stream conforming to the multichannel digital audio interface ("MADI") standard set forth in the AES-10 standard. In this regard, it should be noted that a MADI input digital audio data stream may contain up to 32 AES digital audio data streams and that each one of the second inputs 142-1 through 142-N contains a single AES digital audio data stream which had previously been extracted from a MADI input digital audio data stream by extraction circuitry (not shown). Thus, the output of each one of the selector circuits 138-1 through 138-N provides one of N input digital audio data streams to each of the first and second router matrices 102a and 102b of the first broadcast router component 102. Each one of the selector circuits 138-1 through 138-N further includes a control input (not shown) for selecting between the AES-11 and MADI input digital audio data streams. Of course, it should be readily appreciated that other types of input data streams other than the input digital audio data streams disclosed herein are equally suitable for use with the first broadcast router component 102, as well as with the second, third and fourth broadcast router components 104, 106 and 108. For example, it is contemplated that the broadcast router components 102, 104, 106 and 108 may instead be used with other low bandwidth digital signals such as compressed video and data signals. It is further contemplated that, with minor modifications, for example, faster hardware, the broadcast router components 102, 104, 106 and 108 may be used with non-compressed digital video signals.

The selected input digital audio data stream output each one of the selector circuits 138-1 through 138-N is fed into a routing engine 144, a first expansion port 146, a second expansion port 148 and a third expansion port 150 of the first router matrix 102a. Additionally, the selected input digital audio data stream output each one of the selector circuits 138-1 through 138-N is fed into a routing engine 152, a first expansion port 154, a second expansion port 156 and a third expansion port 158 of the second router matrix 102b. Residing within the routing engine 144 of the first router matrix 102a is switching means for assigning any one of the input digital audio data signals received as inputs to the routing engine 144 to any one of the output lines of the routing engine 144. Variously, it is contemplated that the routing engine 144 may be embodied in software, for example, as a series of instructions; hardware, for example, as a series of logic circuits; or a combination thereof. In a broad sense, each one of the first, second and third expansion ports 146, 148 and 150 of the first router matrix 102a is comprised of a memory subsystem in which: (1) input digital audio data streams received from the selector circuits 138-1 through 138-n of a first broadcast router component; and (2) input digital audio data streams received from an expansion port of a first router matrix of a second broadcast router component may be buffered before transfer to their final destination and a processor subsystem for controlling: (1) the transfer of the input digital audio data streams received from the selector circuits 138-1 through 138-N to an expansion port of the first router matrix of another broadcast router component; and (2) the transfer of the input digital audio data streams received from the expansion port of the first router matrix of the other broadcast router component to inputs of the routing engine 144 of the first router matrix 102a of the first broadcast router component 102. Similarly, residing within the routing engine 152 of the second router matrix 102b is switching means for assigning any one of the input digital audio data signals received as inputs to the routing engine 152 to any one of the output lines of the routing engine 152. Again, it is contemplated that the routing engine 152 may be variously embodied in software, hardware or a combination thereof. In a broad sense, each one of the first, second and third expansion ports 154 156 and 158 of the second router matrix 102b is comprised of a memory subsystem in which: (1) input digital audio data streams received from the selector circuits 138-1 through 138-N of the first broadcast router component 102; and (2) input digital audio data streams received from an expansion port of a second router matrix of the second broadcast router component may be buffered before transfer to their final destination and a processor subsystem for controlling: (1) the transfer of the input digital audio data streams received from the selector circuits 138-1 through 138-N to an expansion port of the second router matrix of the second broadcast router component; and (2) the transfer of the input digital audio data streams received from the expansion port of the second router matrix of the second broadcast router component to inputs of the routing engine 152 of the first router matrix 102b of the first broadcast router component 102.

Figure 6:
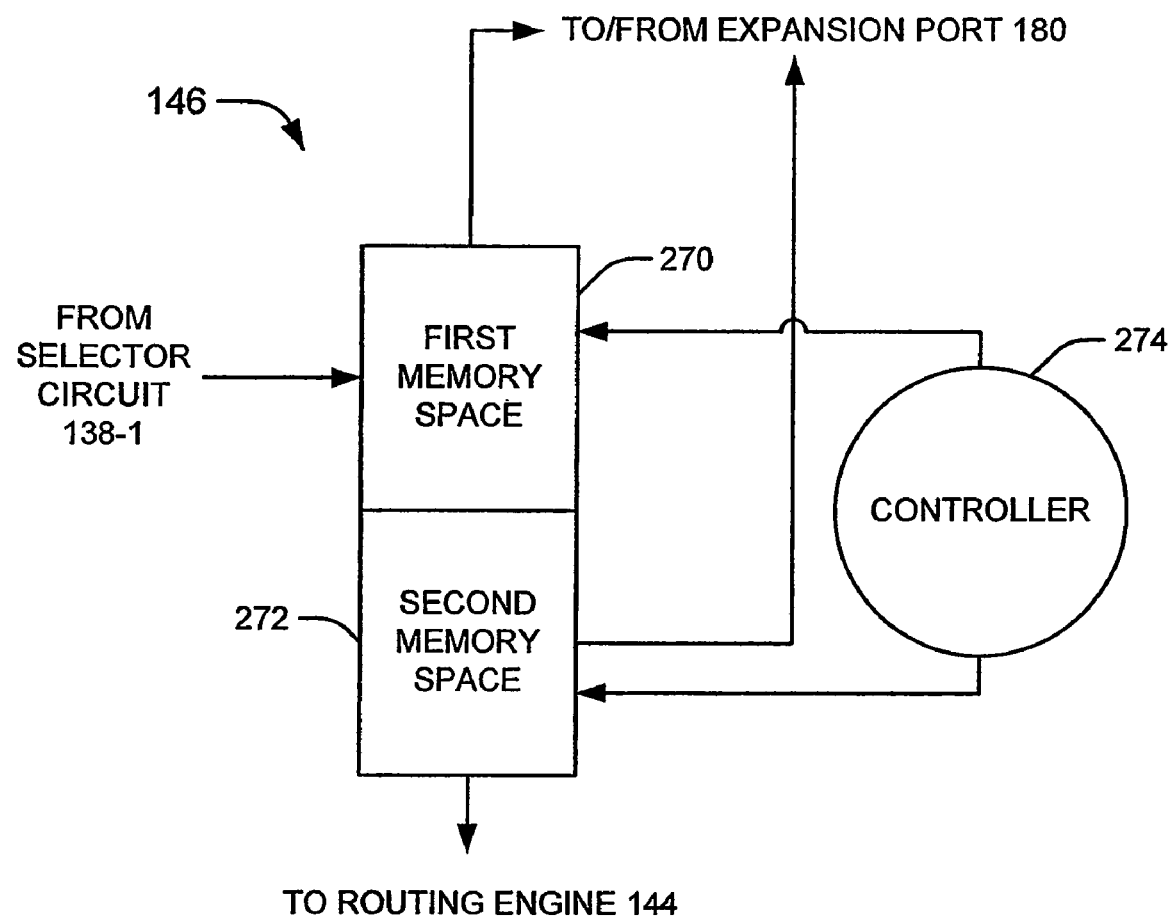
FIG. 6 is an expanded block diagram of a first expansion port of the first broadcast router component of FIG. 2.

Turning momentarily to FIG. 6, the expansion port 146 of the first router matrix 102a of the first broadcast router component 102 will now be described in greater detail. In this regard, it should be noted that, while only the first expansion port 130 is described and illustrated herein, second and third expansion ports 148 and 150 of the first router matrix 102a of the first broadcast router component 102, first, second and third expansion ports 152, 154 and 156 of the second router matrix 102b of the first broadcast router component 102, first, second and third expansion ports 180, 182 and 184 of the first router matrix 104a of the second broadcast router component 104, first, second and third expansion ports 188, 190 and 192 of the second router matrix 104b of the second broadcast router component 104, first, second and third expansion ports 214, 216 and 218 of the first router matrix 106a of the third broadcast router component 106, first, second and third expansion ports 222, 224 and 226 of the second router matrix 106b of the third broadcast router component 106, first, second and third expansion ports 248, 250 and 252 of the first router matrix 108a of the fourth broadcast router component 106 and first, second and third expansion ports 256, 258 and 260 of the second router matrix 108b of the fourth broadcast router component 108 are similarly configured. Accordingly, the description that follows is equally applicable to those expansion ports as well.

As may be seen in FIG. 6, the first expansion port 146 of the first router matrix 102a of the first broadcast router component 102 includes a first memory space 270 and a second memory space 272. Variously, the first and second memory spaces 270 and 272 may be comprised of first and second discrete memory devices or, as shown in FIG. 6, may be comprised of first and second discrete address spaces within a common memory device. The expansion port 146 further includes control circuitry 274, for example, a controller, for controlling the transfer of input digital audio data streams, received by the expansion port 146, to their final destinations. More specifically, the input digital audio data stream output the selector circuit coupled to the expansion port 146, for example, the selector circuit 138-1, is temporarily stored, or buffered, in the first memory space 270. The controller 274 then transfers the digital audio data stored in the first memory space 270 to the second memory space 272 of the expansion port 180 of the first router matrix 104a of the second broadcast router component 104. Similarly, the digital audio data stored in the first memory space 270 of the expansion port 180 of the first router matrix 104a of the second broadcast router component 104 is transferred to the second memory space 272. From the second memory space 272, the controller 274 provides the digital audio data received from the second broadcast router component 104 as inputs to the routing engine 144 for the first router matrix 102a of the first broadcast router component 102. Of course, the configuration and operation of the expansion port 146 is but one device and process suitable for the transfer of digital audio data and it is fully contemplated that other devices and processes involving buffering and/or first-in-first-out ("FIFO") schemes are equally suitable for the purposes disclosed herein.

Figure 3:
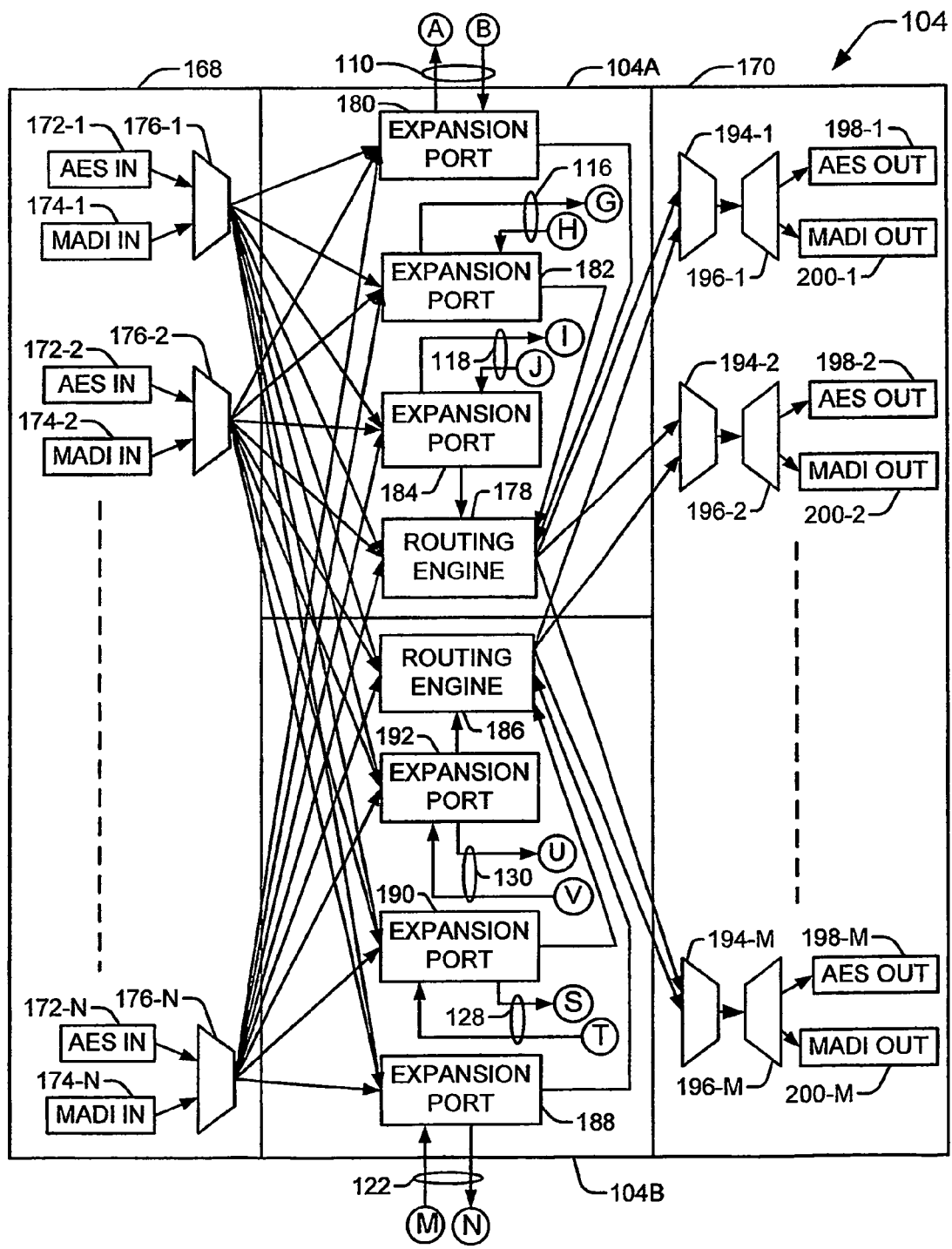
FIG. 3 is an expanded block diagram of a second broadcast router component of the fully redundant linearly expandable broadcast router of FIG. 1.

The second broadcast router component 104 of the fully redundant linearly expandable broadcast router 100 is illustrated in FIG. 3. As may now be seen, the second broadcast router component 104 is comprised of an input side 168, an output side 170 and the first and second router matrices 104a and 104b, both of which are coupled between the input and output sides 202 and 204. The input side 202 includes N selectors 176-1 through 176-N arranged such that the output of each one of the selectors provides one of N inputs to the first and second router matrices 104*a* and 104*b*. As disclosed herein, each one of the selectors 176-1 through 176-N is a 2:1 selector circuit having, as a first input 172-1 through 172-N, respectively, an input digital audio data stream conforming to the AES-11 standard and, as a second input 174-1 through 174-N, respectively, an input digital audio data stream conforming to the MADI standard. Again, it should be noted that a MADI input digital audio data stream may contain up to 32 AES digital audio data streams and that each one of the second inputs 174-1 through 174-N contains a single AES digital audio data stream which had previously been extracted from a MADI input digital audio data stream by extraction circuitry (not shown). Thus, the output of each one of the selector circuits 176-1 through 176-N provides one of N input digital audio data streams to each of the first and second router matrices 104*a* and 104*b* of the second broadcast router component 104. Each one of the selector circuits 176-1 through 176-N further includes a control input (not shown) for selecting between the AES-11 and MADI input digital audio data streams.

The selected input digital audio data stream output each one of the selector circuits 176-1 through 176-N is fed into a routing engine 178, a first expansion port 180, a second expansion port 182 and a third expansion port 184 of the first router matrix 104*a*. Additionally, the selected input digital audio data stream output each one of the selector circuits 176-1 through 176-N is fed into a routing engine 186, a first expansion port 188, a second expansion port 190 and a third expansion port 192 of the second router matrix 102*b*. Residing within the routing engine 178 of the first router matrix 104*a* is switching means for assigning any one of the input digital audio data signals received as inputs to the routing engine 178 to any one of the output lines of the routing engine 178. Variously, it is contemplated that the routing engine 178 may be embodied in software, hardware or a combination thereof. In a broad sense, each one of the first, second and third expansion ports 180, 182 and 184 of the first router matrix 104*a* is comprised of a memory subsystem in which: (1) input digital audio data streams received from the selector circuits 176-1 through 176-N of a first broadcast router component; and (2) input digital audio data streams received from an expansion port of a first router matrix of a second broadcast router component may be buffered before transfer to their final destination and a processor subsystem for controlling: (1) the transfer of the input digital audio data streams received from the selector circuits 176-1 through 176-N to an expansion port of the first router matrix of another broadcast router component; and (2) the transfer of the input digital audio data streams received from the expansion port of the first router matrix of the other broadcast router component to inputs of the routing engine 178 of the first router matrix 104*a* of the second broadcast router component 104.

Similarly, residing within the routing engine 186 of the second router matrix 104*b* is switching means for assigning any one of the input digital audio data signals received as inputs to the routing engine 186 to any one of the output lines of the routing engine 186. Again, it is contemplated that the routing engine 186 may be variously embodied in software, hardware or a combination thereof. In a broad sense, each one of the first, second and third expansion ports 188, 190 and 192 of the second router matrix 104*b* is comprised of a memory subsystem in which: (1) input digital audio data streams received from the selector circuits 176-1 through 176-N of the second broadcast router component 104; and (2) input digital audio data streams received from an expansion port of a second router matrix of another broadcast router component may be buffered before transfer to their final destination and a processor subsystem for controlling: (1) the transfer of the input digital audio data streams received from the selector circuits 176-1 through 176-N to an expansion port of the second router matrix of the other broadcast router component; and (2) the transfer of the input digital audio data streams received from the expansion port of the second router matrix of the other broadcast router component to inputs of the routing engine 186 of the second router matrix 104*b* of the second broadcast router component 104.

Figure 4:
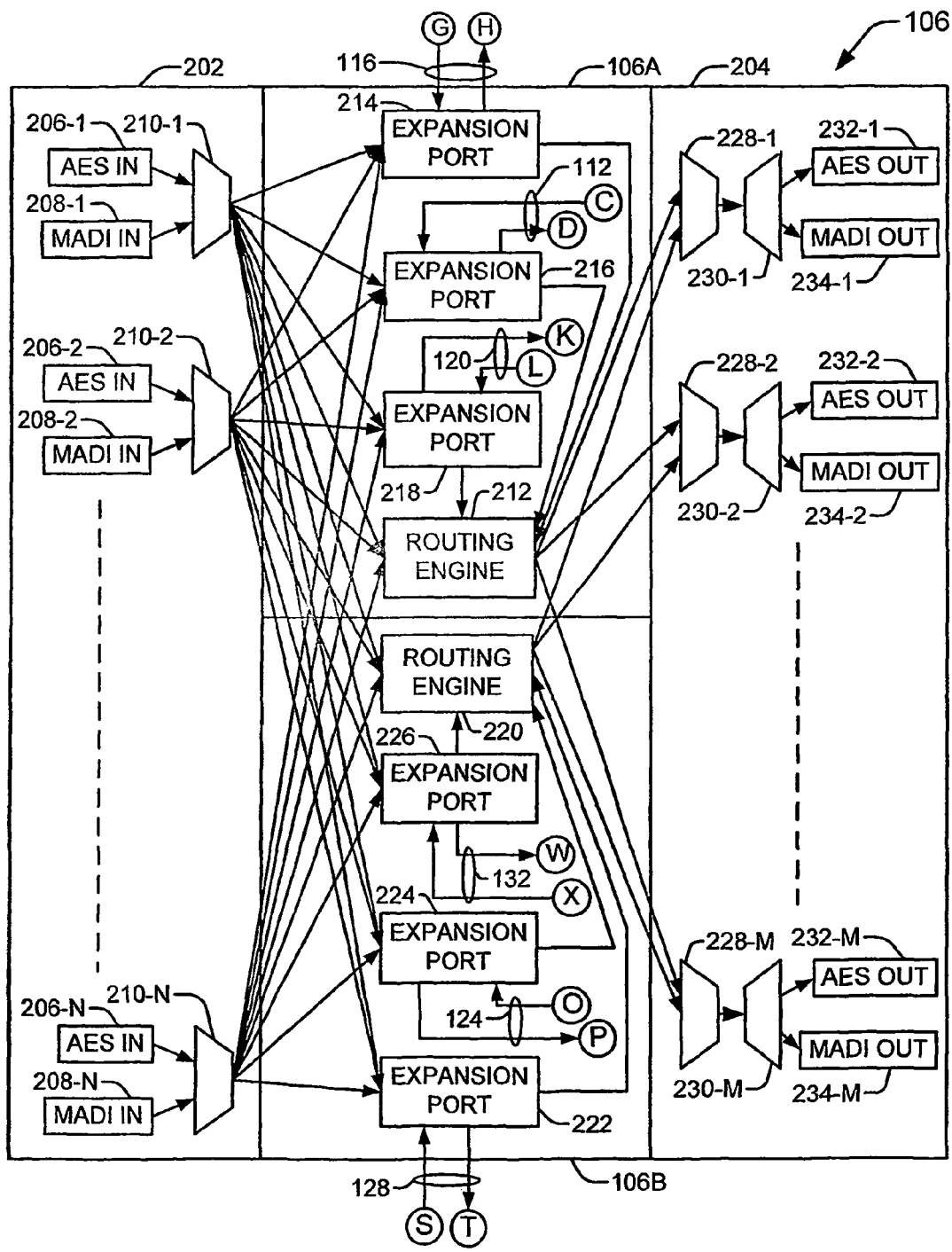
FIG. 4 is an expanded block diagram of a third broadcast router component of the fully redundant linearly expandable broadcast router of FIG. 1.

The third broadcast router component 106 of the fully redundant linearly expandable broadcast router 100 is illustrated in FIG. 4. As may now be seen, the third broadcast router component 106 is comprised of an input side 202, an output side 204 and the first and second router matrices 106*a* and 106*b*, both of which are coupled between the input and output sides 202 and 204. The input side 202 includes N selectors 210-1 through 210-N arranged such that the output of each one of the selectors provides one of N inputs to the first and second router matrices 106*a* and 106*b*. As disclosed herein, each one of the selectors 210-1 through 210-N is a 2:1 selector circuit having, as a first input 206-1 through 206-N, respectively, an input digital audio data stream conforming to the AES-11 standard and, as a second input 208-1 through 208-N, respectively, an input digital audio data stream conforming to the MADI standard. In this regard, it is again noted that a MADI input digital audio data stream may contain up to 32 AES digital audio data streams and that each one of the second inputs 208-1 through 208-N contains a single AES digital audio data stream which had previously been extracted from a MADI input digital audio data stream by extraction circuitry (not shown). Thus, the output of each one of the selector circuits 210-1 through 210-N provides one of N input digital audio data streams to each of the first and second router matrices 106*a* and 106*b* of the third broadcast router component 106. Each one of the selector circuits 210-1 through 210-N further includes a control input (not shown) for selecting between the AES-11 and MADI input digital audio data streams.

The selected input digital audio data stream output each one of the selector circuits 210-1 through 210-*n* is fed into a routing engine 212, a first expansion port 214, a second expansion port 216 and a third expansion port 218 of the first router matrix 106*a*. Additionally, the selected input digital audio data stream output each one of the selector circuits 210-1 through 210-N is fed into a routing engine 220, a first expansion port 222, a second expansion port 224 and a third expansion port 226 of the second router matrix 106*b*. Residing within the routing engine 212 of the first router matrix 106*a* is switching means for assigning any one of the input digital audio data signals received as inputs to the routing engine 212 to any one of the output lines of the routing engine 212. Variously, it is contemplated that the routing engine 144 may be embodied in software, hardware, or a combination thereof. In a broad sense, each one of the first, second and third expansion ports 214, 216 and 218 of the first router matrix 106*a* is comprised of a memory subsystem in which: (1) input digital audio data streams received from the selector circuits 210-1 through 210-N of the third broadcast router component 106; and (2) input digital audio data streams received from an expansion port of a first router matrix of another broadcast router component may be buffered before transfer to their final destination and a processor subsystem for controlling: (1) the transfer of the input digital audio data streams received from the selector circuits 210-1 through 210-N to an expansion port of the first router matrix of the other broadcast router component; and (2) the transfer of the input digital audio data streams received from the expansion port of the first router matrix of the other broadcast router component to inputs of the routing engine 212 of the first router matrix 106a of the third broadcast router component 106. Similarly, residing within the routing engine 220 of the second router matrix 106b is switching means for assigning any one of the input digital audio data signals received as inputs to the routing engine 220 to any one of the output lines of the routing engine 220. Again, it is contemplated that the routing engine 220 may be variously embodied in software, hardware or a combination thereof. In a broad sense, each one of the first, second and third expansion ports 222, 224 and 226 of the second router matrix 106b is comprised of a memory subsystem in which: (1) input digital audio data streams received from the selector circuits 210-1 through 210-N of the first broadcast router component 106; and (2) input digital audio data streams received from an expansion port of a second router matrix of the other broadcast router component may be buffered before transfer to their final destination and a processor subsystem for controlling: (1) the transfer of the input digital audio data streams received from the selector circuits 210-1 through 210-N to an expansion port of the second router matrix of the other broadcast router component; and (2) the transfer of the input digital audio data streams received from the expansion port of the second router matrix of the other broadcast router component to inputs of the routing engine 220 of the second router matrix 106b of the third broadcast router component 106.

Figure 5:
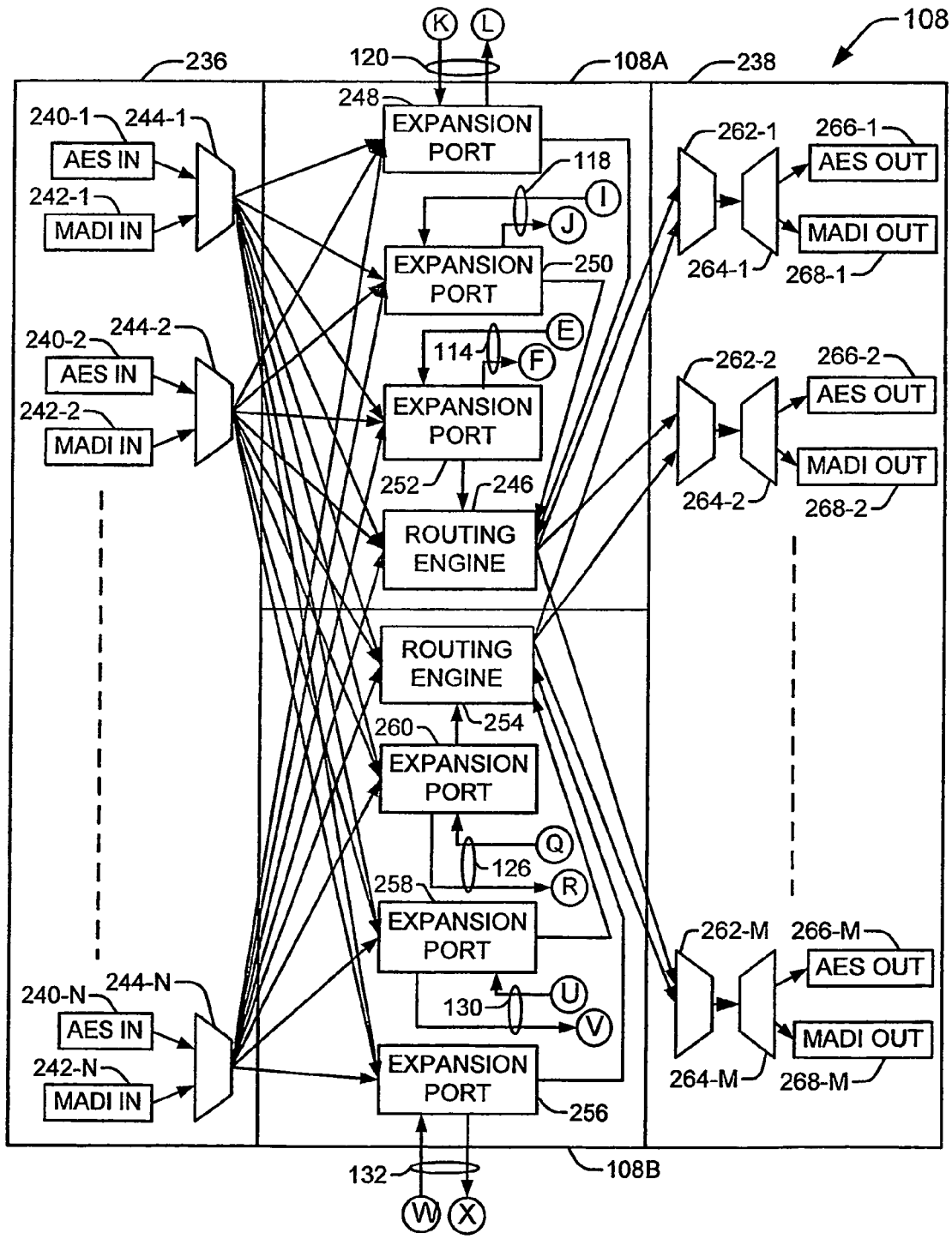
FIG. 5 is an expanded block diagram of a fourth broadcast router component of the fully redundant linearly expandable broadcast router of FIG. 1.

The fourth broadcast router component 108 of the fully redundant linearly expandable broadcast router 100 is illustrated in FIG. 5. As may now be seen, the fourth broadcast router component 108 is comprised of an input side 236, an output side 238 and the first and second router matrices 108a and 108b, both of which are coupled between the input and output sides 236 and 238. The input side 236 includes n selectors 244-1 through 244-N arranged such that the output of each one of the selectors provides one of n inputs to the first and second router matrices 108a and 108b. As disclosed herein, each one of the selectors 244-1 through 244-N is a 2:1 selector circuit having, as a first input 240-1 through 240-N, respectively, an input digital audio data stream conforming to the AES-11 standard and, as a second input 242-1 through 242-N, respectively, an input digital audio data stream conforming to the MADI standard. Thus, the output of each one of the selector circuits 244-1 through 244-N provides one of N input digital audio data streams to each of the first and second router matrices 108a and 108b for the fourth broadcast router component 108. Each one of the selector circuits 244-1 through 244-N further includes a control input (not shown) for selecting between the AES-11 and MADI input digital audio data streams.

The selected input digital audio data stream output each one of the selector circuits 244-1 through 244-N is fed into a routing engine 246, a first expansion port 248, a second expansion port 250 and a third expansion port 252 of the first router matrix 108a. Additionally, the selected input digital audio data stream output each one of the selector circuits 244-1 through 244-N is fed into a routing engine 254, a first expansion port 256, a second expansion port 258 and a third expansion port 260 of the second router matrix 108b. Residing within the routing engine 246 of the first router matrix 108a is switching means for assigning any one of the input digital audio data signals received as inputs to the routing engine 246 to any one of the output lines of the routing engine 246. Variously, it is contemplated that the routing engine 246 may be embodied in software, hardware, or a combination thereof. In a broad sense, each one of the first, second and third expansion ports 248, 250 and 252 of the fourth router matrix 108a is comprised of a memory subsystem in which: (1) input digital audio data streams received from the selector circuits 244-1 through 244-N of a first broadcast router component; and (2) input digital audio data streams received from an expansion port of a first router matrix of another broadcast router component may be buffered before transfer to their final destination and a processor subsystem for controlling: (1) the transfer of the input digital audio data streams received from the selector circuits 244-1 through 244-N to an expansion port of the first router matrix of the other broadcast router component; and (2) the transfer of the input digital audio data streams received from the expansion port of the first router matrix of the other broadcast router component to inputs of the routing engine 246 of the first router matrix 108a of the fourth broadcast router component 108. Similarly, residing within the routing engine 254 of the second router matrix 108b is switching means for assigning any one of the input digital audio data signals received as inputs to the routing engine 254 to any one of the output lines of the routing engine 254. Again, it is contemplated that the routing engine 254 may be variously embodied in software, hardware or a combination thereof. In a broad sense, each one of the first, second and third expansion ports 256, 258 and 260 of the second router matrix 108b is comprised of a memory subsystem in which: (1) input digital audio data streams received from the selector circuits 244-1 through 244-n of the fourth broadcast router component 108; and (2) input digital audio data streams received from an expansion port of a second router matrix of the other broadcast router component may be buffered before transfer to their final destination and a processor subsystem for controlling: (1) the transfer of the input digital audio data streams received from the selector circuits 244-1 through 244-N to an expansion port of the second router matrix of the other broadcast router component; and (2) the transfer of the input digital audio data streams received from the expansion port of the second router matrix of the other broadcast router component to inputs of the routing engine 254 of the second router matrix 108b of the fourth broadcast router component 108.

Referring next to FIGS. 2-5, as a discrete input digital audio data stream is output each of the selector circuits 138-1 through 138-N, the input digital audio data streams fed to each one of the input side of the routing engine 144, the first expansion port 146, the second expansion port 148 and the third expansion port 150 of the first router matrix 102a of the first broadcast router component 102 are audio data input streams 1 through N. Similarly, the input digital audio data streams fed to each one of the input side of the routing engine 178, the first expansion port 180, the second expansion port 182 and the third expansion port 184 of the first router matrix 104a of the second broadcast router component 104 are input digital audio data streams N+1 through 2N; the input digital audio data streams fed to each one of the input side of the routing engine 212, the first expansion port 214, the second expansion port 216 and the third expansion port 218 of the first router matrix of the third broadcast router component 106 are input digital audio data streams 2N+1 through 3N; and the input digital audio data streams fed to each one of the input side of the routing engine 246, the first expansion port 248, the second expansion port 250 and the third expansion port 252 of the first router matrix 108a of the fourth broadcast router component 108 are input digital audio data streams 3N+1 through 4N.

To function as a 4N×4M broadcast router, the routing engine 144 of the first router matrix 102a of the first broadcast router component 102, the routing engine 178 of the second router matrix 104a of the second broadcast router component 104, the routing engine 212 of the third router matrix 106a of the third broadcast router component 106 and the routing engine 246 of the fourth router matrix 108a 8 of the fourth broadcast router component 108 must have all of the input digital audio data streams 1 through 4N provided as inputs to the input side thereof. For the routing engine 144 of the first router matrix 102a of the first broadcast router component 102, the input digital audio data streams 1 through N are provided to the input side of the routing engine 144 directly. The input digital audio data streams 1 through N input the first, second and third expansion ports 146, 148 and 150, on the other hand, are transferred to the first expansion port 180 of the first router matrix 104a of the second broadcast router component 104 over the link 110, the second expansion port 216 of the first router matrix 106b of the third broadcast router component 106 over the link 112 and the third expansion port 252 of the first router matrix 108a of the fourth broadcast router component 108 over the link 114, respectively. From the first expansion port 180 of the first router matrix 104a of the second broadcast router component 104, the second expansion port 216 of the first router matrix 106a of the third broadcast router component 106 and the third expansion port 252 of the first router matrix 108a of the fourth broadcast router component 108, the input digital audio data streams 1 through N are input the routing engine 178 of the first router matrix 104a of the second broadcast router component 104, the routing engine 212 of the first router matrix 106a of the third broadcast router component 106 and the routing engine 246 of the first router matrix 108a of the fourth broadcast router components 108, respectively.

Similarly, for the first router matrix 104a of the second broadcast router component 104, the input digital audio data streams N+1 through 2N are provided to the input side of the routing engine 178 directly. The input digital audio data streams N+1 through 2N input the first, second and third expansion ports 180, 182 and 184, on the other hand, are transferred to the first expansion port 130 of the first router matrix 102a of the broadcast router component 102 over the link 110, the first expansion port 214 of the first router matrix 106a of the third broadcast router component 106 over the link 116 and the second expansion port 250 of the first router matrix 108a of the fourth broadcast router component 108 over the link 118, respectively. From the first expansion port 180 of the first router matrix 102a of the first broadcast router component 102, the first expansion port 214 of the first router matrix 106a of the third broadcast router component 106 and the second expansion port 250 of the first router matrix 108a of the fourth broadcast router component 108, the input digital audio data streams N+1 through 2N are input the routing engine 144 of the first routing matrix 102a of the first broadcast router component 102, the routing engine 212 of the first routing matrix 106a of the third broadcast router component 106 and the routing engine 246 of the first routing matrix 108a of the fourth router component 108; respectively.

For the first router matrix 106a of the third broadcast router component 106, the input digital audio data streams 2N+1 through 3N are input the routing engine 212 directly. The input digital audio data streams 2N+1 through 3N input the first, second and third expansion ports 214, 216 and 218, on the other hand, are transferred to the second expansion port 182 of the first router matrix 104a of the second broadcast router component 104 over the link 116, the second expansion port 148 of the first router matrix 102a of the first broadcast router component 102 over the link 112 and the first expansion port 248 of the first router matrix 108a of the fourth broadcast router component 108 over the link 120, respectively. From the second expansion port 182 of the first router matrix 104a of the second broadcast router component 104, the second expansion port 148 of the first router matrix 102a of the first broadcast router component 102 and the first expansion port 248 of the first router matrix 108a of the fourth broadcast router component 108, the input digital audio data streams 2N+1 through 3N are input the routing engine 144 of the first router matrix 102a of the first broadcast router 102, the routing engine 178 of the first router matrix 104a of the second broadcast router 104 and the routing engine 246 of the first router matrix 108a of the fourth broadcast router component 108.

Finally, for the first router matrix 108a of the fourth broadcast router component 108, the input digital audio data streams 3N+1 through 4N are input the routing engine 246 directly. The input digital audio data streams 3N+1 through 4N input the first, second and third expansion ports 248, 250 and 252, on the other hand, are transferred to the third expansion port 218 of the first router matrix 106a of the third broadcast router component 106 over the link 120, the third expansion port 184 of the first router matrix 104a of the second broadcast router component 104 over the link 118 and the third expansion port 150 of the first router matrix 102a of the broadcast router component 102 over the link 114, respectively. From the third expansion port 150 of the first router matrix 102a of the first broadcast router component 102, the third expansion port 184 of the first router matrix 104a of the second broadcast router component 104 and the third expansion port 218 of the first router matrix 106a of the third broadcast router component 106, the input digital audio data streams 3N+1 through 4N are input the routing engine 144 of the first routing matrix 102a of the first broadcast router component 102, the routing engine 178 of the first routing matrix 104a of the second broadcast router component 104 and the routing engine 212 of the first routing matrix 106a of the third broadcast router component 106. In this manner, the routing engine 144 of the first router matrix 102a of the first broadcast router component 102, the routing engine 178 of the first router matrix 104a of the second broadcast router component 104, the routing engine 212 of the first router matrix 106a of the third broadcast router component 106 and the routing engine 246 of the first router matrix 108a of the fourth broadcast router component 108 all receive, as inputs thereto, the input digital audio data streams 1 through 4N.

Within the routing engine 144 of the first router matrix 102a of the first broadcast router component 102, switch logic or other switching means enables any one of the input digital audio data streams 1 through 4N to be applied to any of the 1 through M outputs thereof. Similarly, switch logic or other switching means within the routing engine 178 of the first router matrix 104a of the second broadcast router component 104, the routing engine 212 of the first router matrix 106a of the third broadcast router component and the routing engine 246 of the first router matrix 108a of the fourth router component 108 enables any one of the input digital audio data streams 1 through 4N to be applied to any of the M+1 through 2M, 2M+1 through 3M and 3M+1 through 4M outputs thereof, respectively. The switching logic or other switching means within each of the routing engines 144, 178, 212, and 246 is controlled by one or more control inputs which originate at a controller (not shown) or other control circuitry for the linearly expandable broadcast router 100.

As previously set forth, the second router matrices 102b, 104b, 106b and 108b are redundant router matrices available for use in the event that the respective one or ones of the first router matrices 102a, 104a, 106a and 108a fail. To function as redundant matrices, the second router matrices 102b, 104b, 106*b* and 108*b* must receive/transmit the same input/output digital audio data streams as the corresponding one of the first router matrices 102*a*, 104*a*, 106*a* and 108*a*. Accordingly, the selector circuits 138-1 through 138-N also feed input digital audio data streams 1 through N to each one of the routing engine 152, the first expansion port 154, the second expansion port 156 and the third expansion port 158 of the second router matrix 102*b* of the first broadcast router component 102. Similarly, the selector circuits 176-1 through 176-N also feed input digital audio data streams N+1 through 2N to each one of the routing engine 186, the first expansion port 188, the second expansion port 190 and the third expansion port 192 of the second router matrix 104*b* of the second broadcast router component 104; the selector circuits 210-1 through 210-N also feed input digital audio data streams 2N+1 through 3N to each one of the routing engine 220, the first expansion port 222, the second expansion port 224 and the third expansion port 226 of the second router matrix 106*b* of the third broadcast router component 106; and the selector circuits 244-1 through 244-N also feed input digital audio data streams 3N+1 through 4N to each one of the routing engine 254, the first expansion port 256, the second expansion port 258 and the third expansion port 260 of the second router matrix 108*b* of the fourth broadcast router component 108.

The routing engine 152 of the second router matrix 102*b* of the first broadcast router component 102, the routing engine 186 of the second router matrix 104*b* of the second broadcast router component 104, the routing engine 220 of the second router matrix 106*b* of the third broadcast router component 106 and the routing engine 254 of the second router matrix 108*b* of the fourth broadcast router component 108 must have all of the input digital audio data streams 1 through 4N provided as inputs thereto. For the routing engine 152 of the second router matrix 102*b* of the first broadcast router component 102, the selector circuits 138-1 through 138-N provide input digital audio data streams 1 through N as inputs thereto. The input digital audio data streams 1 through N input the first, second and third expansion ports 154, 156 and 158, on the other hand, are transferred to the first expansion port 188 of the second router matrix 104*b* of the second broadcast router component 104 over the link 122, the second expansion port 224 of the second router matrix 106*b* of the third broadcast router component 106 over the link 124 and the third expansion port 260 of the second router matrix 108*b* of the fourth broadcast router component 108 over the link 126, respectively. From the first expansion port 188 of the second router matrix 104*b* of the second broadcast router component 104, the second expansion port 224 of the second router matrix 106*b* of the third broadcast router component 106 and the third expansion port 260 of the second router matrix 108*b* of the fourth broadcast router component 108, the input digital audio data streams 1 through N are input the routing engine 186 of the second router matrix 104*b* of the second broadcast router component 104, the routing engine 220 of the second router matrix 106*b* of the third broadcast router component 106 and the routing engine 254 of the second router matrix 108*b* of the fourth broadcast router components 108, respectively.

Similarly, for the second router matrix 104*b* of the second broadcast router component 104, the input digital audio data streams N+1 through 2N are directly input the routing engine 186. The input digital audio data streams N+1 through 2N input the first, second and third expansion ports 188, 190 and 192, on the other hand, are transferred to the first expansion port 154 of the second router matrix 102*b* of the broadcast router component 102 over the link 122, the first expansion port 222 of the second router matrix 106*b* of the third broadcast router component 106 over the link 128 and the second expansion port 258 of the second router matrix 108*b* of the fourth broadcast router component 108 over the link 130, respectively. From the first expansion port 154 of the second router matrix 102*b* of the first broadcast router component 102, the first expansion port 222 of the second router matrix 106*b* of the third broadcast router component 106 and the second expansion port 258 of the second router matrix 108*b* of the fourth broadcast router component 108, the input digital audio data streams N+1 through 2N are input the routing engine 152 of the second routing matrix 102*b* of the first broadcast router component 102, the routing engine 220 of the second routing matrix 106*b* of the third broadcast router component 106 and the routing engine 254 of the second routing matrix 108*a* of the fourth router component 108, respectively.

For the second router matrix 106*b* of the third broadcast router component 106, the input digital audio data streams 2N+1 through 3N are input the routing engine 220 directly. The input digital audio data streams 2N+1 through 3N input the first, second and third expansion ports 222, 224 and 226, on the other hand, are transferred to the second expansion port 190 of the second router matrix 104*b* of the second broadcast router component 104 over the link 128, the second expansion port 156 of the second router matrix 102*b* of the first broadcast router component 102 over the link 126 and the first expansion port 256 of the second router matrix 108*b* of the fourth broadcast router component 108 over the link 132, respectively. From the second expansion port 190 of the second router matrix 104*b* of the second broadcast router component 104, the second expansion port 156 of the second router matrix 102*b* of the first broadcast router component 102 and the first expansion port 256 of the second router matrix 108*b* of the fourth broadcast router component 108, the input digital audio data streams 2N+1 through 3N are input the routing engine 152 of the second router matrix 102*b* of the first broadcast router 102, the routing engine 186 of the second router matrix 104*b* of the second broadcast router 104 and the routing engine 254 of the second router matrix 108*b* of the fourth broadcast router component 108.

Finally, for the second router matrix 108*b* of the fourth broadcast router component 108, the input digital audio data streams 3N+1 through 4N are input the routing engine 254 directly. The input digital audio data streams 3N+1 through 4N input the first, second and third expansion ports 256, 258 and 260, on the other hand, are transferred to the third expansion port 226 of the second router matrix 106*b* of the third broadcast router component 106 over the link 132, the third expansion port 192 of the second router matrix 104*b* of the second broadcast router component 104 over the link 130 and the second expansion port 156 of the second router matrix 102*b* of the broadcast router component 102 over the link 126, respectively. From the second expansion port 156 of the second router matrix 102*b* of the first broadcast router component 102, the third expansion port 192 of the second router matrix 104*b* of the second broadcast router component 104 and the third expansion port 226 of the second router matrix 106*b* of the third broadcast router component 106, the input digital audio data streams 3N+1 through 4N are input the routing engine 152 of the second routing matrix 102*b* of the first broadcast router component 102, the routing engine 186 of the second routing matrix 104*b* of the second broadcast router component 104 and the routing engine 220 of the second routing matrix 106*b* of the third broadcast router component 106. In this manner, the routing engine 152 of the second router matrix 102*b* of the first broadcast router component 102, the routing engine 186 of the second router matrix 104*b* of the second broadcast router component 104, the routing engine 220 of the second router matrix 106*b* of the third broadcast router component 106 and the routing engine 254 of the second router matrix 108*b* of the fourth broadcast router component 108 all receive, as inputs thereto, the input digital audio data streams 1 through 4N.

Within the routing engine 152 of the second router matrix 102*b* of the first broadcast router component 102, switch logic or other switching means enables any one of the input digital audio data streams 1 through 4N to be applied to any of the 1 through M outputs thereof. Similarly, switch logic or other switching means within the routing engine 186 of the second router matrix 104*b* of the second broadcast router component 104, the routing engine 220 of the second router matrix 106*b* of the third broadcast router component and the routing engine 254 of the second router matrix 108*b* of the fourth router component 108 enables any one of the input digital audio data streams 1 through 4N to be applied to any of the M+1 through 2M, 2M+1 through 3M and 3M+1 through 4M outputs thereof, respectively. The switching logic or other switching means within each of the routing engines 152, 186, 220, and 254 is controlled by one or more control inputs which originate at a controller (not shown) or other control circuitry for the fully redundant linearly expandable broadcast router 100.

Each one of the 1 through M digital audio data streams output the routing engines 144 and 152 of the first and second routing matrices 102*a* and 102*b*, respectively, of the first broadcast router component 102 are propagated to a corresponding one of first selector circuits 160-1 through 160-M. The first selector circuits 160-1 through 160-M collectively determine whether the 1 through m digital audio data streams output the routing engine 144 of the first routing matrix 102*a* or the 1 through M digital audio data streams output the routing engine 152 of the second routing matrix 102*b* shall be the output of the first broadcast router component 102. Each one of the first selector circuits 160-1 through 160-M share a common control input (not shown) for selecting whether the digital audio data streams output the routing engine 144 or the digital audio data streams output the routing engine 152 shall be passed by the first selector circuits 160-1 through 160-M.

Similarly, each one of the M+1 through 2M digital audio data streams output the routing engines 178 and 186 of the first and second routing matrices 104*a* and 104*b*, respectively, of the second broadcast router component 104 are propagated to corresponding ones of first selector circuits 228-1 through 228-M. The first selector circuits 228-1 through 228-M collectively determine whether the 1 through M digital audio data streams output the routing engine 178 of the first routing matrix 104*a* or the 1 through M digital audio data streams output the routing engine 186 of the second routing matrix 104*b* shall be the output of the second broadcast router component 104. Each one of the first selector circuits 228-1 through 228-M share a common control input (not shown) for selecting whether the digital audio data streams output the routing engine 178 or the digital audio data streams output the routing engine 186 shall be passed by the first selector circuits 228-1 through 228-M.

Similarly again, each one of the 2M+1 through 3M digital audio data streams output the routing engines 212 and 220 of the first and second routing matrices 106*a* and 106*b*, respectively, of the third broadcast router component 106 are propagated to corresponding ones of first selector circuits 228-1 through 228-M. The first selector circuits 228-1 through 228-M collectively determine whether the 2M+1 through 3M digital audio data streams output the routing engine 212 of the first routing matrix 106*a* or the 2M+1 through 3M digital audio data streams output the routing engine 220 of the second routing matrix 106*b* shall be the output of the third broadcast router component 106. Each one of the first selector circuits 228-1 through 228-M share a common control input (not shown) for selecting whether the digital audio data streams output the routing engine 212 or the digital audio data streams output the routing engine 220 shall be passed by the first selector circuits 228-1 through 228-M.

Finally, each one of the 3M+1 through 4M digital audio data streams output the routing engines 246 and 254 of the first and second routing matrices 108*a* and 108*b*, respectively, of the fourth broadcast router component 108 are propagated to corresponding ones of first selector circuits 262-1 through 262-M. The first selector circuits 262-1 through 262-M collectively determine whether the 3M+1 through Mm digital audio data streams output the routing engine 246 of the first routing matrix 108*a* or the 3M+1 through 4M digital audio data streams output the routing engine 256 of the second routing matrix 108*b* shall be the output of the fourth broadcast router component 104. Each one of the first selector circuits 262-1 through 262-M share a common control input (not shown) for selecting whether the digital audio data streams output the routing engine 246 or the digital audio data streams output the routing engine 254 shall be passed by the first selector circuits 262-1 through 262-M.

Thus, in the foregoing manner, each one of the first, second, third and fourth broadcast router components 102, 104, 106 and 108 has a router matrix pair, specifically, the router matrix pairs 102*a* and 102*b*, 104*a* and 104*b*, 106*a* and 106*b*, and 108*a* and 108*b*, configured such that a first one of the router matrix pair may readily function as a back-up to a second one of the router matrix pair in the event of a failure thereof. To switch between the first and second ones of the router matrix pair, for example, to switch from the first router matrix 102*a* to the second router matrix 102*b*, the common control input to the corresponding first selector circuits 160-1 through 160-M, which had been previously set such that the output of the first router matrix 102*a* is passed by the selector circuits 160-1 through 160-M, is switched between states such that the first selector circuits 160-1 through 160-M shall now pass the output of the second router matrix 102*b*.

Each one of the 1 through M, M+1 through 2M, 2M+1 through 3M and 3M+1 through 4M digital audio data streams passed by the first selector circuits 160-1 through 160-M, 194-1 through 194-M, 228-1 through 228-M and 262-1 through 262-M, respectively, are then propagated to a corresponding second selector circuit 162-1 through 162-M, 196-1 through 196-M, 230-1 through 230-M and 264-1 through 264-M. As disclosed herein, each one of the second selector circuits 162-1 through 162-M, 196-1 through 196-M, 230-1 through 230-M and 264-1 through 264-M is a 1:2 selector circuit having an input coupled to a corresponding output of the first selector circuit 160-1 through 160-M, 194-1 through 194-M, 228-1 through 228-M and 262-1 through 262-M, a first output 164-1 through 164-M, 198-1 through 198-M, 232-1 through 232-M and 266-1 through 266-M configured to transmit an output digital audio data stream conforming to the AES-11 standard and a second output 166-1 through 166-*m*, 200-1 through 200-M, 234-1 through 234-M and 268-1 through 268-M configured to transmit an output digital audio data stream conforming to the MADI standard. Each one of the second selector circuits 162-1 through 162-M, 196-1 through 196-M, 230-1 through 230-M and 264-1 through 264-M further includes a control input (not shown) for selecting between the AES-11 and MADI output digital audio data streams.

In an alternate embodiment of the invention not shown in the drawings, the selector circuits 138-1 through 138-N, 176-1 through 175-N, 210-1 through 210-N, 244-1 through 244-N, 162-1 through 162-M, 196-1 through 196-M, 230-1 through 230-M and 264-1 through 264-M may be omitted if the broadcast router components 102, 104, 106 and 108 are instead configured to handle input digital audio data streams conforming to a single standard, for example, the AES-11 standard, the MADI standard or another standard not specifically recited herein. In accordance with this configuration, however, each of the N input digital audio data streams for the first broadcast router component 102 would be fed directly to the routing engine 144, first expansion port 146, second expansion port 148 and third expansion port 150 of the first router matrix 102a and the routing engine 152, first expansion port 154, second expansion port 156 and third expansion port 158 of the second router matrix 102b. Similarly, each of the N input digital audio data streams for the second broadcast router component 104 would be fed directly to the routing engine 178, first expansion port 180, second expansion port 182 and third expansion port 184 of the first router matrix 104a and the routing engine 186, first expansion port 188, second expansion port 190 and third expansion port 192 of the second router matrix 104. Similarly again, each of the N input digital audio data streams for the third broadcast router component 106 would be fed directly to the routing engine 212, the first expansion port 214, the second expansion port 216 and the third expansion port 218 of the first router matrix 106a and the routing engine 220, the first expansion port 222, the second expansion port 224 and the third expansion port 226 of the second router matrix 106b. Finally, each of the N input digital audio data streams for the fourth broadcast router component 108 would be fed directly to the routing engine 246, the first expansion port 248, the second expansion port 250 and the third expansion port 252 of the first router matrix 108a and the routing engine 254, the first expansion port 256, the second expansion port 258 and the third expansion port 260 of the second router matrix 108b. In further accordance with this alternate embodiment of the invention, each of the M output digital audio data streams output the first selector circuits 160-1 through 160-M, 194-1 through 194-M, 228-1 through 228-M and 262-1 through 262-M of the first, second, third and fourth broadcast router components 102, 104, 106 and 108, respectively, would be outputs of the fully redundant linearly expandable broadcast router 100 itself.

Referring next to FIGS. 7-10, an alternate configuration of the broadcast router components of the fully redundant linearly expandable broadcast router 100 will now be described in greater detail. More specifically, for each of the first, second, third and fourth broadcast router components 102, 104, 106 and 108, the first, second and third expansion ports have been removed in favor of a transmitting expansion port, a first receiving expansion port, a second receiving expansion port and a third receiving expansion port. By the term "transmitting" expansion port, it is intended to refer to an expansion port from which data is transmitted to a selected destination. Similarly, by the term "receiving" expansion port, it is intended to refer to an expansion port which receives data from a destination.

Figure 7:
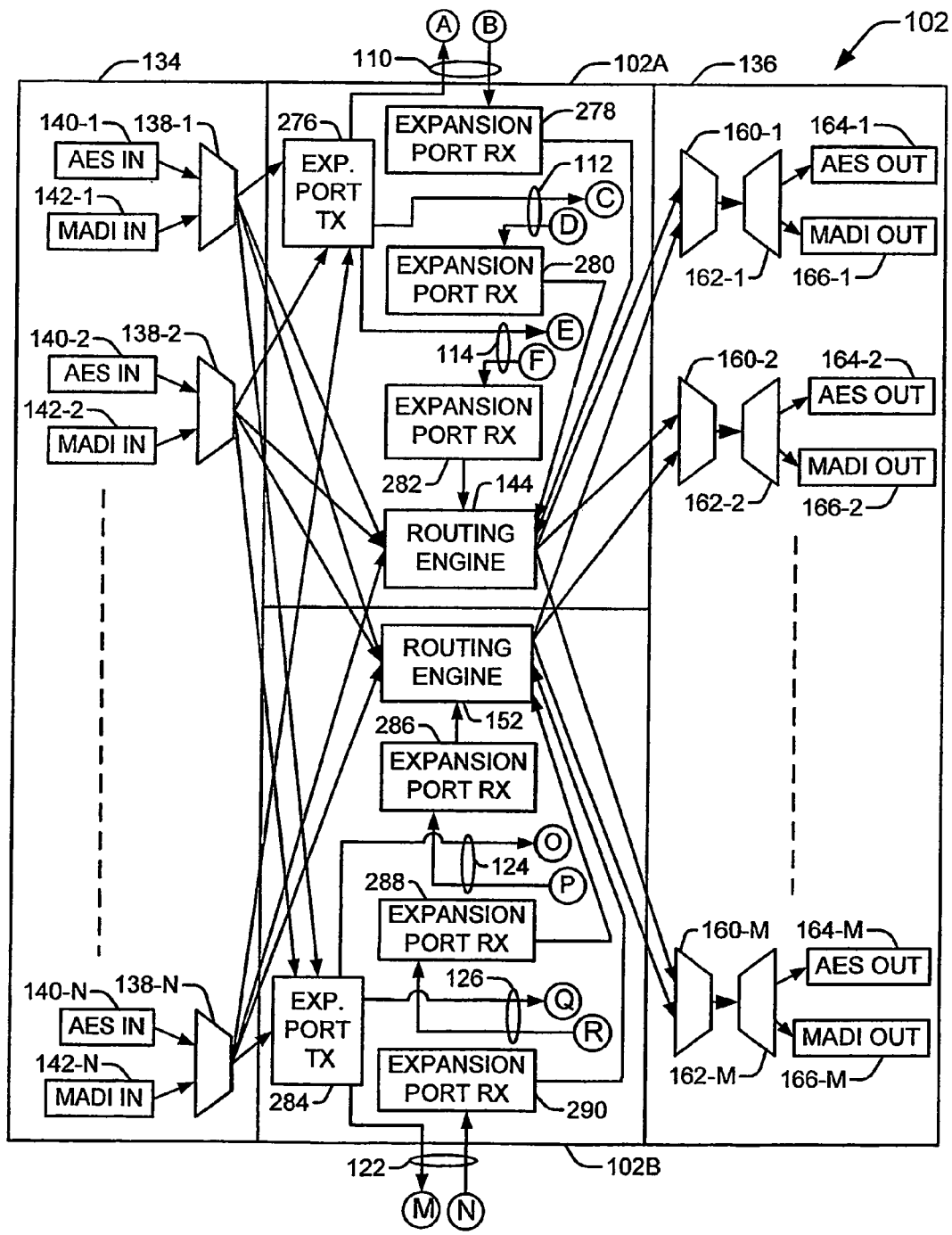
FIG. 7 is an expanded block diagram of an alternate embodiment of the first broadcast router component of the fully redundant linearly expandable broadcast router of FIG. 1.

The alternate configuration of the first broadcast router component 102 may be seen in FIG. 7. As may now be seen, the first router matrix 102a is now comprised of the routing engine 144, a transmitting expansion port 276, a first receiving expansion port 278, a second receiving expansion port 280 and a third receiving expansion port 282. Similarly, the second router matrix 102b is comprised of the routing engine 152, a transmitting expansion port 284, a first receiving expansion port 286, a second receiving expansion port 288 and a third receiving expansion port 290. In a broad sense, the transmitting expansion port 276 of the first router matrix 102a is comprised of a memory subsystem in which input digital audio data streams received from the selector circuits 140-1 through 140-N of the first broadcast router component 102 are buffered before transfer to plural destinations and a processor subsystem for controlling the transfer of the input digital audio data streams received from the selector circuits 140-1 through 140-N to a receiving expansion port of the first router matrix 104a of the second broadcast router component 104, a receiving expansion port of the first router matrix 106a of the third broadcast router component 106 and a receiving expansion port of the first router matrix 108a of the fourth broadcast router component 108. Conversely, each one of the first, second and third expansion ports 278, 280 and 282 of the first router matrix 102a are, in a broad sense, comprised of a memory subsystem in which input digital audio data streams received from a transmitting expansion port of the first router matrix of another broadcast router component may be buffered before transfer to their final destination and a processor subsystem for controlling the transfer of the input digital audio data streams received from the transmitting expansion port of the first router matrix of the other broadcast router component to inputs of the routing engine 144 of the first router matrix 102a of the first broadcast router component 102.

Similarly, in one sense, the transmitting expansion port 276 of the second router matrix 102b is comprised of a memory subsystem in which input digital audio data streams received from the selector circuits 140-1 through 140-N of the first broadcast router component 102 are buffered before transfer to plural destinations and a processor subsystem for controlling the transfer of the input digital audio data streams received from the selector circuits 140-1 through 140-N to a receiving expansion port of the second router matrix 104a of the second broadcast router component 104, a receiving expansion port of the second router matrix 106b of the third broadcast router component 106 and a receiving expansion port of the second router matrix 108b of the fourth broadcast router component 108. Conversely, each one of the first, second and third expansion ports 278, 280 and 282 of the second router matrix 102b are, in one aspect, comprised of a memory subsystem in which input digital audio data streams received from a transmitting expansion port of the second router matrix of another broadcast router component may be buffered before transfer to their final destination and a processor subsystem for controlling the transfer of the input digital audio data streams received from the transmitting expansion port of the second router matrix of the other broadcast router component to inputs of the routing engine 144 of the second router matrix 102b of the first broadcast router component 102.

Figure 8:
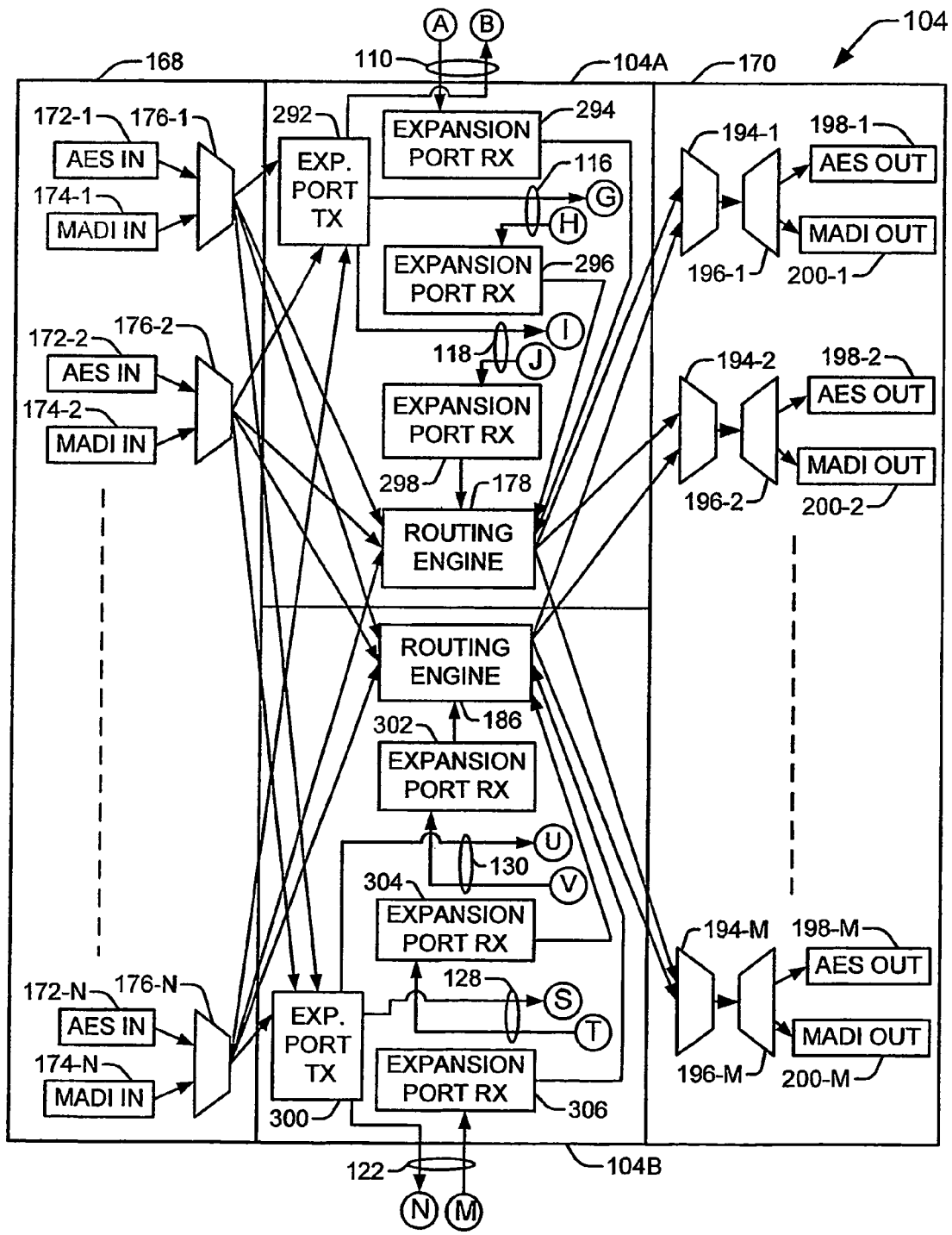
FIG. 8 is an expanded block diagram of an alternate embodiment of the second broadcast router component of the fully redundant linearly expandable broadcast router of FIG. 1.

The alternate configuration of the second broadcast router component 104 may be seen in FIG. 8. As may now be seen, the first router matrix 104a is now comprised of the routing engine 178, a transmitting expansion port 292, a first receiving expansion port 294, a second receiving expansion port 296 and a third receiving expansion port 298. Similarly, the second router matrix 102b is comprised of the routing engine 186, a transmitting expansion port 300, a first receiving expansion port 302, a second receiving expansion port 304 and a third receiving expansion port 306. In a broad sense, the transmitting expansion port 292 of the first router matrix 104a is comprised of a memory subsystem in which input digital audio data streams received from the selector circuits 172-1 through 172-N of the second broadcast router component 104 are buffered before transfer to plural destinations and a processor subsystem for controlling the transfer of the input digital audio data streams received from the selector circuits 172-1 through 172-N to a receiving expansion port of the first router matrix 102a of the first broadcast router component 102, a receiving expansion port of the first router matrix 106a of the third broadcast router component 106 and a receiving expansion port of the first router matrix 108a of the fourth broadcast router component 108. Conversely, each one of the first, second and third expansion ports 294, 296 and 298 of the first router matrix 104a are, in a broad sense, comprised of a memory subsystem in which input digital audio data streams received from a transmitting expansion port of the first router matrix of another broadcast router component may be buffered before transfer to their final destination and a processor subsystem for controlling the transfer of the input digital audio data streams received from the transmitting expansion ports of the first router matrix of the other broadcast router components to inputs of the routing engine 178 of the first router matrix 104a of the second broadcast router component 102.

Similarly, in one sense, the transmitting expansion port 300 of the second router matrix 104b of the second broadcast router component 104 is comprised of a memory subsystem in which input digital audio data streams received from the selector circuits 172-1 through 172-N of the second broadcast router component 104 are buffered before transfer to plural destinations and a processor subsystem for controlling the transfer of the input digital audio data streams received from the selector circuits 172-1 through 172-N to a receiving expansion port of the second router matrix 102b of the first broadcast router component 102, the second router matrix 106b of the third broadcast router component 106 and the second router matrix 108b of the fourth broadcast router component 108. Conversely, each one of the first, second and third expansion ports 303, 304 and 306 of the second router matrix 104b are, in one aspect, comprised of a memory subsystem in which input digital audio data streams received from an transmission expansion port of the second router matrix of another broadcast router component may be buffered before transfer to their final destination and a processor subsystem for controlling the transfer of the input digital audio data streams received from the transmitting expansion port of the second router matrix of the other broadcast router component to inputs of the routing engine 186 of the second router matrix 104b of the second broadcast router component 104.

Figure 9:
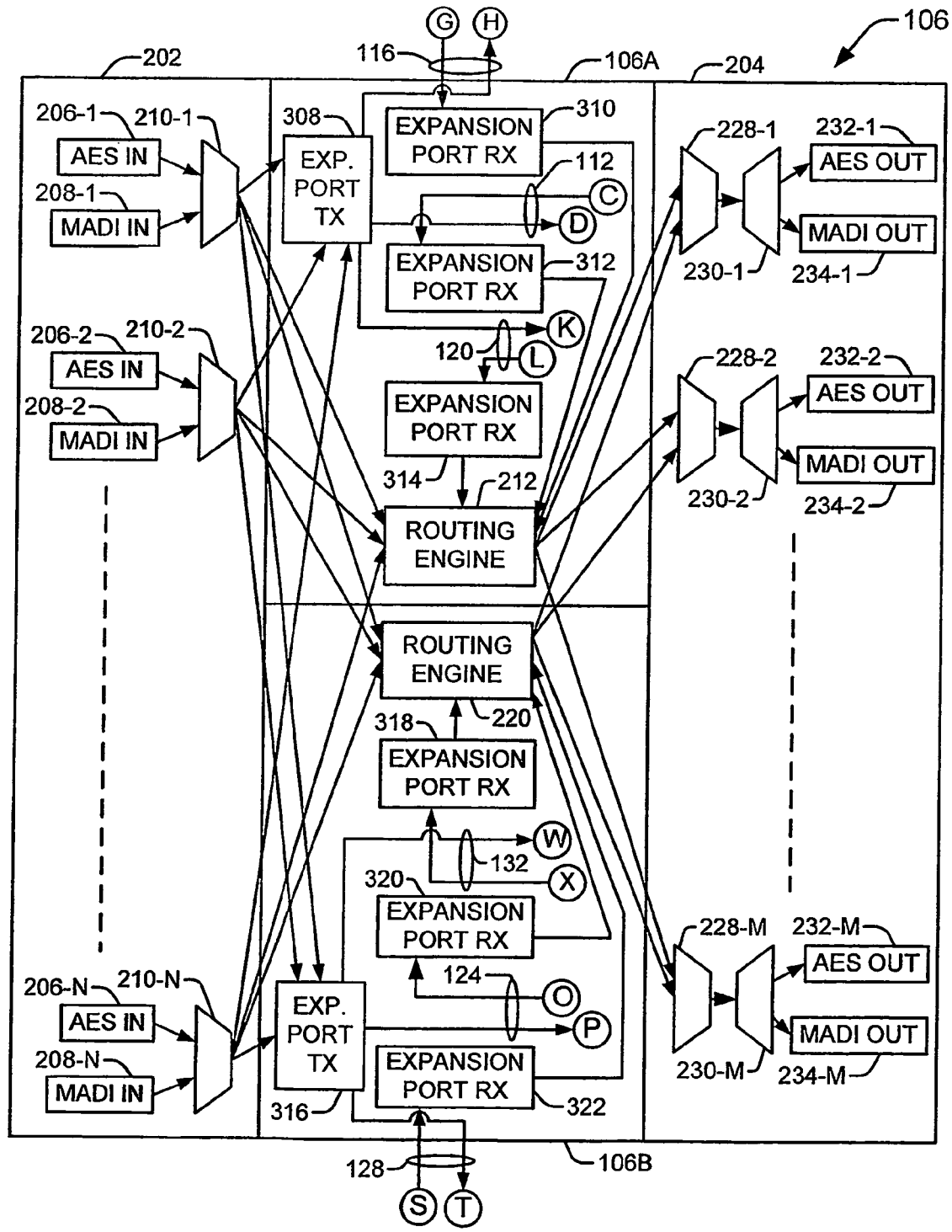
FIG. 9 is an expanded block diagram of an alternate embodiment of the third broadcast router component of the fully redundant linearly expandable broadcast router of FIG. 1.

The alternate configuration of the third broadcast router component 106 may be seen in FIG. 9. As may now be seen, the first router matrix 106a is now comprised of the routing engine 212, a transmitting expansion port 308, a first receiving expansion port 310, a second receiving expansion port 312 and a third receiving expansion port 314. Similarly, the second router matrix 106b is comprised of the routing engine 220, a transmitting expansion port 316, a first receiving expansion port 318, a second receiving expansion port 320 and a third receiving expansion port 322. In a broad sense, the transmitting expansion port 308 of the first router matrix 106a is comprised of a memory subsystem in which input digital audio data streams received from the selector circuits 210-1 through 210-N of the third broadcast router component 106 are buffered before transfer to plural destinations and a processor subsystem for controlling the transfer of the input digital audio data streams received from the selector circuits 210-1 through 210-N to a receiving expansion port of the first router matrix 102a of the first broadcast router component 102, a receiving expansion port of the first router matrix 104a of the second broadcast router component 104 and a receiving expansion port of the first router matrix 108a of the fourth broadcast router component 108. Conversely, each one of the first, second and third expansion ports 310, 312 and 314 of the first router matrix 106a are, in a broad sense, comprised of a memory subsystem in which input digital audio data streams received from a transmitting expansion port of the first router matrix of another broadcast router component may be buffered before transfer to their final destination and a processor subsystem for controlling the transfer of the input digital audio data streams received from the transmitting expansion ports of the first router matrix of the other broadcast router components to inputs of the routing engine 212 of the first router matrix 106a of the third broadcast router component 106.

Similarly, in one sense, the transmitting expansion port 316 of the second router matrix 106b of the third broadcast router component 106 is comprised of a memory subsystem in which input digital audio data streams received from the selector circuits 210-1 through 210-N of the third broadcast router component 106 are buffered before transfer to plural destinations and a processor subsystem for controlling the transfer of the input digital audio data streams received from the selector circuits 210-1 through 210-N to a receiving expansion port of the second router matrix 102b of the first broadcast router component 102, a receiving expansion port of the second router matrix 104b of the second broadcast router component 104 and the second router matrix 108b of the fourth broadcast router component 108. Conversely, each one of the first, second and third expansion ports 318, 320 and 322 of the second router matrix 106b are, in one aspect, comprised of a memory subsystem in which input digital audio data streams received from a transmission expansion port of the second router matrix of another broadcast router component may be buffered before transfer to their final destination and a processor subsystem for controlling the transfer of the input digital audio data streams received from the transmitting expansion port of the second router matrix of the other broadcast router component to inputs of the routing engine 220 of the second router matrix 106b of the third broadcast router component 106.

Figure 10:
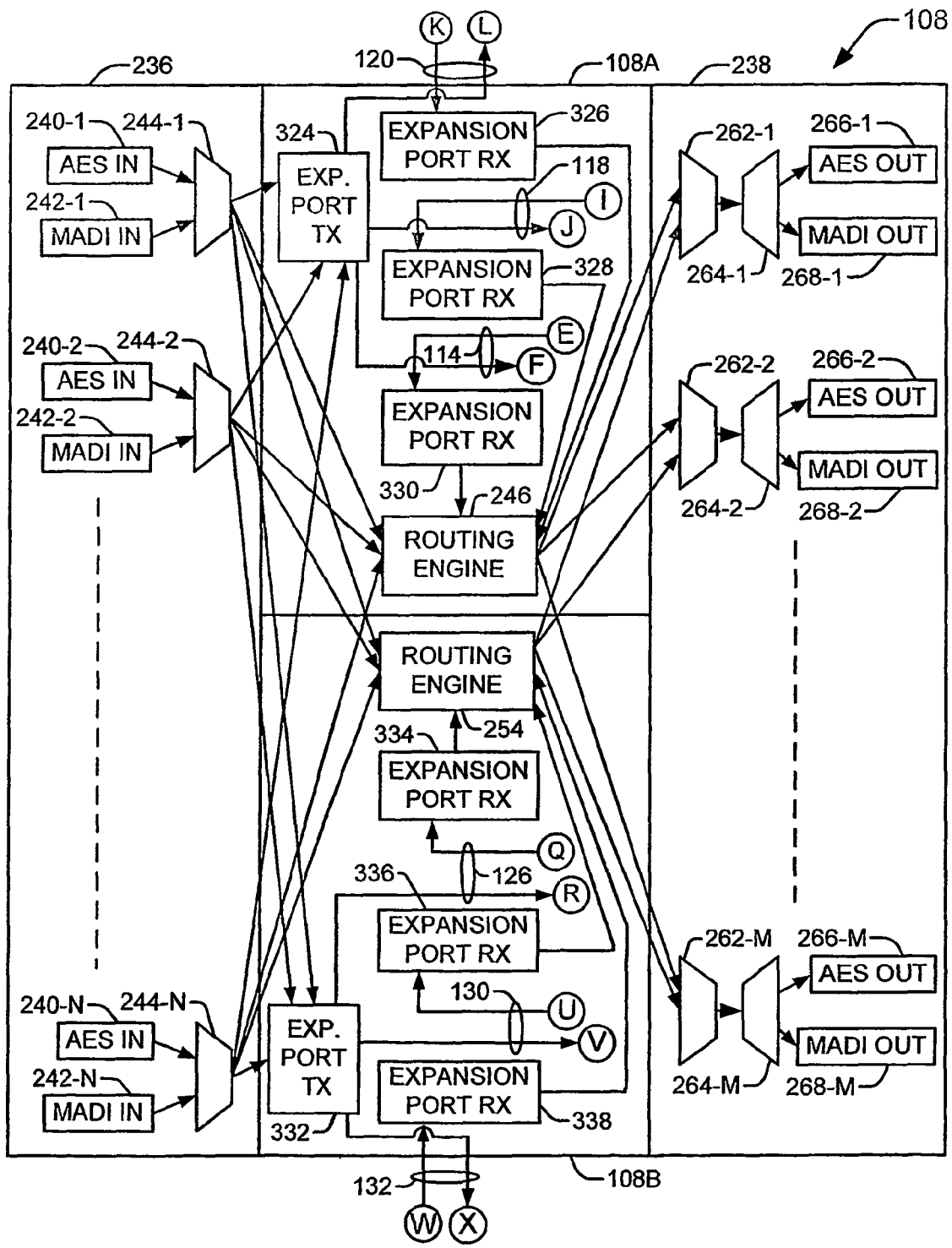
FIG. 10 is an expanded block diagram of an alternate embodiment of the fourth broadcast router component of the fully redundant linearly expandable broadcast router of FIG. 1.

The alternate configuration of the fourth broadcast router component 108 may be seen in FIG. 10. As may now be seen, the first router matrix 108a is now comprised of the routing engine 246, a transmitting expansion port 324, a first receiving expansion port 326, a second receiving expansion port 328 and a third receiving expansion port 330. Similarly, the second router matrix 108b is comprised of the routing engine 254, a transmitting expansion port 332, a first receiving expansion port 334, a second receiving expansion port 336 and a third receiving expansion port 338. In a broad sense, the transmitting expansion port 324 of the first router matrix 108a is comprised of a memory subsystem in which input digital audio data streams received from the selector circuits 244-1 through 244-N of the fourth broadcast router component 108 are buffered before transfer to plural destinations and a processor subsystem for controlling the transfer of the input digital audio data streams received from the selector circuits 244-1 through 244-N to a receiving expansion port of the first router matrix 102a of the first broadcast router component 102, a receiving expansion port of the first router matrix 104a of the second broadcast router component 104 and a receiving expansion port of the first router matrix 106a of the third broadcast router component 106. Conversely, each one of the first, second and third expansion ports 326, 328 and 330 of the first router matrix 108a are, in a broad sense, comprised of a memory subsystem in which input digital audio data streams received from a transmitting expansion port of the first router matrix of another broadcast router component may be buffered before transfer to their final destination and a processor subsystem for controlling the transfer of the input digital audio data streams received from the transmitting expansion ports of the first router matrix of the other broadcast router components to inputs of the routing engine 246 of the first router matrix 108a of the fourth broadcast router component 108.

Similarly, in one sense, the transmitting expansion port 332 of the second router matrix 108b of the fourth broadcast router component 108 is comprised of a memory subsystem in which input digital audio data streams received from the selector circuits 244-1 through 244-N of the fourth broadcast router component 108 are buffered before transfer to plural destinations and a processor subsystem for controlling the transfer of the input digital audio data streams received from the selector circuits 244-1 through 244-N to a receiving expansion port of the second router matrix 102ba of the first broadcast router component 102, the second router matrix 104b of the second broadcast router component 104 and the second router matrix 106b of the third broadcast router component 106. Conversely, each one of the first, second and third expansion ports 334, 336 and 338 of the second router matrix 108b are, in one aspect, comprised of a memory subsystem in which input digital audio data streams received from a transmission expansion port of the second router matrix of another broadcast router component may be buffered before transfer to their final destination and a processor subsystem for controlling the transfer of the input digital audio data streams received from the transmitting expansion port of the second router matrix of the other broadcast router component to inputs of the routing engine 254 of the second router matrix 108b of the fourth broadcast router component 108.

Referring next to FIGS. 7-10, as a discrete input digital audio data stream is output each of the selector circuits 138-1 through 138-N, the input digital audio data streams fed to the routing engine 144 and the expansion transmission port 276 of the first router matrix 102a of the first broadcast router component 102 are audio data input streams 1 through N. Similarly, the input digital audio data streams fed to the routing engine 178 and the transmission expansion port 292 of the first router matrix 104a of the second broadcast router component 104 are input digital audio data streams N+1 through 2N; the input digital audio data streams fed to the routing engine 212 and the transmission expansion port 308 of the first router matrix 106a of the third broadcast router component 106 are input digital audio data streams 2N+1 through 3N; and the input digital audio data streams fed to each one of the routing engine 246 and the transmission expansion port 324 of the first router matrix 108a of the fourth broadcast router component 108 are input digital audio data streams 3N+1 through 4N.

As before, to function as a 4N×4M broadcast router, the routing engine 144 of the first router matrix 102a of the first broadcast router component 102, the routing engine 178 of the second router matrix 104a of the second broadcast router component 104, the routing engine 212 of the third router matrix 106a of the third broadcast router component 106 and the routing engine 246 of the fourth router matrix 108a of the fourth broadcast router component 108 must have all of the input digital audio data streams 1 through 4N provided as inputs to the input side thereof. For the routing engine 144 of the first router matrix 102a of the first broadcast router component 102, the input digital audio data streams 1 through N are provided to the input side of the routing engine 144 directly. The input digital audio data streams 1 through N input the transmitting expansion port 276, on the other hand, are transferred to the first receiving expansion port 294 of the first router matrix 104a of the second broadcast router component 104 over the link 110, the second receiving expansion port 312 of the first router matrix 106b of the third broadcast router component 106 over the link 112 and the second receiving expansion port 330 of the first router matrix 108a of the fourth broadcast router component 108 over the link 114, respectively. From the first receiving expansion port 294 of the first router matrix 104a of the second broadcast router component 104, the second receiving expansion port 312 of the first router matrix 106a of the third broadcast router component 106 and the second receiving expansion port 330 of the first router matrix 108a of the fourth broadcast router component 108, the input digital audio data streams 1 through N are input the routing engine 178 of the first router matrix 104a of the second broadcast router component 104, the routing engine 212 of the first router matrix 106a of the third broadcast router component 106 and the routing engine 246 of the first router matrix 108a of the fourth broadcast router components 108, respectively.

Similarly, for the first router matrix 104a of the second broadcast router component 104, the input digital audio data streams N+1 through 2n are provided to the input side of the routing engine 178 directly. The input digital audio data streams N+1 through 2N input the transmitting expansion port 292, on the other hand, are transferred to each of the first receiving expansion port 278 of the first router matrix 102a of the broadcast router component 102 over the link 110, the first receiving expansion port 310 of the first router matrix 106a of the third broadcast router component 106 over the link 116 and the second receiving expansion port 328 of the first router matrix 108a of the fourth broadcast router component 108 over the link 118, respectively. From the first receiving expansion port 278 of the first router matrix 102a of the first broadcast router component 102, the first receiving expansion port 310 of the first router matrix 106a of the third broadcast router component 106 and the second receiving expansion port 328 of the first router matrix 108a of the fourth broadcast router component 108, the input digital audio data streams N+1 through 2N are input the routing engine 144 of the first routing matrix 102a of the first broadcast router component 102, the routing engine 212 of the first routing matrix 106a of the third broadcast router component 106 and the routing engine 246 of the first routing matrix 108a of the fourth router component 108, respectively.

For the first router matrix 106a of the third broadcast router component 106, the input digital audio data streams 2N+1 through 3N are input the routing engine 212 directly. The input digital audio data streams 2N+1 through 3N input the transmitting expansion ports 308, on the other hand, is transferred to each of the second receiving expansion port 296 of the first router matrix 104a of the second broadcast router component 104 over the link 116, the second receiving expansion port 280 of the first router matrix 102a of the first broadcast router component 102 over the link 112 and the first receiving expansion port 326 of the first router matrix 108a of the fourth broadcast router component 108 over the link 120, respectively. From the second receiving expansion port 296 of the first router matrix 104a of the second broadcast router component 104, the second receiving expansion port 280 of the first router matrix 102a of the first broadcast router component 102 and the first receiving expansion port 326 of the first router matrix 108a of the fourth broadcast router component 108, the input digital audio data streams 2N+1 through 3N are input the routing engine 144 of the first router matrix 102a of the first broadcast router 102, the routing engine 178 of the first router matrix 104*a* of the second broadcast router 104 and the routing engine 246 of the first router matrix 108*a* of the fourth broadcast router component 108.

Finally, for the first router matrix 108*a* of the fourth broadcast router component 108, the input digital audio data streams 3N+1 through 4N are input the routing engine 246 directly. The input digital audio data streams 3N+1 through 4N input the transmitting expansion port 324, on the other hand, is transferred to each one of the third receiving expansion port 314 of the first router matrix 106*a* of the third broadcast router component 106 over the link 120, the third receiving expansion port 298 of the first router matrix 104*a* of the second broadcast router component 104 over the link 118 and the third receiving expansion port 282 of the first router matrix 102*a* of the broadcast router component 102 over the link 114, respectively. From the third receiving expansion port 282 of the first router matrix 102*a* of the first broadcast router component 102, the third receiving expansion port 298 of the first router matrix 104*a* of the second broadcast router component 104 and the third receiving expansion port 314 of the first router matrix 106*a* of the third broadcast router component 106, the input digital audio data streams 3N+1 through 4N are input the routing engine 144 of the first routing matrix 102*a* of the first broadcast router component 102, the routing engine 178 of the first routing matrix 104*a* of the second broadcast router component 104 and the routing engine 212 of the first routing matrix 106*a* of the third broadcast router component 106. In this manner, the routing engine 144 of the first router matrix 102*a* of the first broadcast router component 102, the routing engine 178 of the first router matrix 104*a* of the second broadcast router component 104, the routing engine 212 of the first router matrix 106*a* of the third broadcast router component 106 and the routing engine 246 of the first router matrix 108*a* of the fourth broadcast router component 108 all receive, as inputs thereto, the input digital audio data streams 1 through 4N.

In this embodiment as well, the second router matrices 102*b*, 104*b*, 106*b* and 108*b* are redundant router matrices available for use in the event that the respective one or ones of the first router matrices 102*a*, 104*a*, 106*a* and 108*a* fail. To function as redundant matrices, the second router matrices 102*b*, 104*b*, 106*b* and 108*b* must receive/transmit the same input/output digital audio data streams as the corresponding one of the first router matrices 102*a*, 104*a*, 106*a* and 108*a*. Accordingly, the selector circuits 138-1 through 138-N also feed input digital audio data streams 1 through N to each of the routing engine 152 and the first transmitting expansion port 284 of the second router matrix 102*b* of the first broadcast router component 102. Similarly, the selector circuits 176-1 through 176-N also feed input digital audio data streams N+1 through 2N to each of the routing engine 186 and the transmitting expansion port 300 of the second router matrix 104*b* of the second broadcast router component 104; the selector circuits 210-1 through 210-N also feed input digital audio data streams 2N+1 through 3N to each of the routing engine 220 and the transmitting expansion port 316 of the second router matrix 106*b* of the third broadcast router component 106; and the selector circuits 244-1 through 244-*n* also feed input digital audio data streams 3N+1 through 4N to each of the routing engine 254 and the transmitting expansion port 332 of the second router matrix 108*b* of the fourth broadcast router component 108.

Also as before, the routing engine 152 of the second router matrix 102*b* of the first broadcast router component 102, the routing engine 186 of the second router matrix 104*b* of the second broadcast router component 104, the routing engine 220 of the second router matrix 106*b* of the third broadcast router component 106 and the routing engine 254 of the second router matrix 108*b* of the fourth broadcast router component 108 must have all of the input digital audio data streams 1 through 4N provided as inputs thereto. For the routing engine 152 of the second router matrix 102*b* of the first broadcast router component 102, the selector circuits 138-1 through 138-N provide input digital audio data streams 1 through N as inputs thereto. The input digital audio data streams 1 through N input the transmitting expansion port 284, on the other hand, is transferred to each of the first receiving expansion port 306 of the second router matrix 104*b* of the second broadcast router component 104 over the link 122, the second receiving expansion port 320 of the second router matrix 106*b* of the third broadcast router component 106 over the link 124 and the first receiving expansion port 334 of the second router matrix 108*b* of the fourth broadcast router component 108 over the link 126, respectively. From the first receiving expansion port 306 of the second router matrix 104*b* of the second broadcast router component 104, the second receiving expansion port 320 of the second router matrix 106*b* of the third broadcast router component 106 and the first receiving expansion port 334 of the second router matrix 108*b* of the fourth broadcast router component 108, the input digital audio data streams 1 through N are input the routing engine 186 of the second router matrix 104*b* of the second broadcast router component 104, the routing engine 220 of the second router matrix 106*b* of the third broadcast router component 106 and the routing engine 254 of the second router matrix 108*b* of the fourth broadcast router components 108, respectively.

Similarly, for the second router matrix 104*b* of the second broadcast router component 104, the input digital audio data streams N+1 through 2N are directly input the routing engine 186. The input digital audio data streams N+1 through 2N input the transmitting expansion port 300, on the other hand, is transferred to each one of the third receiving expansion port 290 of the second router matrix 102*b* of the first broadcast router component 102 over the link 122, the third receiving expansion port 322 of the second router matrix 106*b* of the third broadcast router component 106 over the link 128 and the second receiving expansion port 336 of the second router matrix 108*b* of the fourth broadcast router component 108 over the link 130, respectively. From the third receiving expansion port 290 of the second router matrix 102*b* of the first broadcast router component 102, the third receiving expansion port 322 of the second router matrix 106*b* of the third broadcast router component 106 and the second receiving expansion port 336 of the second router matrix 108*b* of the fourth broadcast router component 108, the input digital audio data streams N+1 through 2N are input the routing engine 152 of the second routing matrix 102*b* of the first broadcast router component 102, the routing engine 220 of the second routing matrix 106*b* of the third broadcast router component 106 and the routing engine 254 of the second routing matrix 108*a* of the fourth router component 108, respectively.

For the second router matrix 106*b* of the third broadcast router component 106, the input digital audio data streams 2N+1 through 3N are input the routing engine 220 directly. The input digital audio data streams 2N+1 through 3N input the transmitting expansion port 316, on the other hand, is transferred to each one of the second receiving expansion port 304 of the second router matrix 104*b* of the second broadcast router component 104 over the link 128, the first receiving expansion port 286 of the second router matrix 102*b* of the first broadcast router component 102 over the link 124 and the third receiving expansion port 338 of the second router matrix 108b of the fourth broadcast router component 108 over the link 132, respectively. From the second receiving expansion port 304 of the second router matrix 104b of the second broadcast router component 104, the first receiving expansion port 286 of the second router matrix 102b of the first broadcast router component 102 and the third receiving expansion port 338 of the second router matrix 108b of the fourth broadcast router component 108, the input digital audio data streams 2N+1 through 3N are input the routing engine 152 of the second router matrix 102b of the first broadcast router 102, the routing engine 186 of the second router matrix 104b of the second broadcast router 104 and the routing engine 254 of the second router matrix 108b of the fourth broadcast router component 108.

Finally, for the second router matrix 108b of the fourth broadcast router component 108, the input digital audio data streams 3N+1 through 4N are input the routing engine 254 directly. The input digital audio data streams 3N+1 through 4N input the transmitting expansion port 332, on the other hand, is transferred to each one of the first receiving expansion port 318 of the second router matrix 106b of the third broadcast router component 106 over the link 132, the first receiving expansion port 302 of the second router matrix 104b of the second broadcast router component 104 over the link 130 and the second receiving expansion port 288 of the second router matrix 102b of the first broadcast router component 102 over the link 126, respectively. From the second receiving expansion port 288 of the second router matrix 102b of the first broadcast router component 102, the first receiving expansion port 302 of the second router matrix 104b of the second broadcast router component 104 and the first receiving expansion port 318 of the second router matrix 106b of the third broadcast router component 106, the input digital audio data streams 3N+1 through 4N are input the routing engine 152 of the second routing matrix 102b of the first broadcast router component 102, the routing engine 186 of the second routing matrix 104b of the second broadcast router component 104 and the routing engine 220 of the second routing matrix 106b of the third broadcast router component 106. In this manner, the routing engine 152 of the second router matrix 102b of the first broadcast router component 102, the routing engine 186 of the second router matrix 104b of the second broadcast router component 104, the routing engine 220 of the second router matrix 106b of the third broadcast router component 106 and the routing engine 254 of the second router matrix 108b of the fourth broadcast router component 108 all receive, as inputs thereto, the input digital audio data streams 1 through 4N. Further processing of the input digital audio streams 1 through 4N will then proceed in the manner hereinabove described with respect to FIGS. 2-5.

Thus, there has been disclosed and illustrated herein a robust linearly expandable broadcast router which, by employing a fully connected topology between the plural broadcast router components forming the linearly expandable broadcast router, enjoys improved fault tolerance over prior linearly expandable broadcast routers using plural bus structures to interconnect the plural broadcast router components. Further, by eliminating redundant links, the linearly expandable broadcast router represents an economical and cost-effective solution to many broadcast router needs. While preferred embodiments of this invention have been shown and described herein, various modifications and other changes can be made by one skilled in the art to which the invention pertains without departing from the spirit or teaching of this invention. Accordingly, the scope of protection is not limited to the embodiments described herein, but is only limited by the claims that follow.

The invention claimed is:

1. An expandable router for routing a signal from at least one input to one or more outputs, comprising:
   at least X routing components, where X is an integer greater than two, each of the X routing components having first and second routing engines, each routing engine having M inputs and N outputs where M and N are integers both greater than one, each routing engine routing a signal from one of the M inputs to one or more of the N outputs;
   each first routing engine of each of the X routing components having its inputs coupled by first links in a first fully connected topology to inputs of others of the first routing engines of the X routing components;
   each second routing engine of each of the X routing components having its inputs coupled by second links in a second fully connected topology to inputs of others of the second routing engines of the X routing components, wherein said second links are different from said first links;
   wherein the coupling of the inputs of the inputs of the routing engines affords the routing engines with a common set of XM inputs, with each of the first and second routing engines in each routing component serving as a backup to the other of the routing engines in the same routing component.

2. The router according to claim 1 wherein the links between inputs of each routing engine of a routing component and inputs of a routing engine of another routing component are bi-directional.

3. The router according to claim 1 wherein the links between inputs of each routing engine of a routing component and inputs of a routing engine of another routing component comprise pairs of unidirectional links.

4. The router according to claim 1 wherein each routing component further comprises first and second expansion modules.

5. The router according to claim 4 wherein each expansion module comprises first and second memories each capable of storing data received at the expansion module.

6. The method according to claim 5 wherein each expansion module further includes a controller for transferring data between the first and second memories.

* * * * *